US006839542B2

(12) United States Patent
Sibecas et al.

(10) Patent No.: US 6,839,542 B2
(45) Date of Patent: Jan. 4, 2005

(54) VIRTUAL DYNAMIC CELLULAR INFRASTRUCTURE BASED ON COORDINATE INFORMATION

(75) Inventors: Salvador Sibecas, Lake Worth, FL (US); Adrian Napoles, Turin (IT); Eric Thomas Eaton, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 189 days.

(21) Appl. No.: 10/200,846

(22) Filed: Jul. 22, 2002

(65) Prior Publication Data

US 2004/0203342 A1 Oct. 14, 2004

(51) Int. Cl.[7] .................................................. H04B 7/00

(52) U.S. Cl. ..................... 455/41.2; 455/445; 455/11.1; 370/338; 370/315

(58) Field of Search ............................... 455/11.1, 41.2, 455/456.2, 41.3, 445, 456.1, 418, 419, 420, 414.2; 370/338, 901, 908, 315, 320, 389, 397, 399

(56) References Cited

U.S. PATENT DOCUMENTS 5,335,246 A 8/1994 Yokev et al.
5,903,618 A 5/1999 Miyake et al.
5,999,124 A 12/1999 Sheynblat
6,028,853 A * 2/2000 Haartsen ..................... 370/338
6,055,429 A * 4/2000 Lynch ........................ 455/445
6,208,297 B1 3/2001 Fattouche et al.
6,246,376 B1 6/2001 Bork et al.
6,246,693 B1 6/2001 Davidson et al.
6,330,452 B1 12/2001 Fattouche et al.
6,519,460 B1 * 2/2003 Haartsen .................. 455/452.1
6,570,857 B1 * 5/2003 Haartsen et al. ............ 370/312
6,600,754 B1 * 7/2003 Young et al. ............... 370/459
6,622,018 B1 * 9/2003 Erekson ...................... 455/420
6,633,757 B1 * 10/2003 Hermann et al. ........... 370/908

* cited by examiner

*Primary Examiner*—Nick Corsaro
(74) *Attorney, Agent, or Firm*—Shigeharu Furukawa

(57) ABSTRACT

A wireless communication system (100) having portable communication devices (102, 104, and 106) capable of establishing direct terminal (102)-to-terminal (104) communication (108 and 110) and indirect terminal (102)-to-terminal (104) communication (112, 118 and 114, 116) through another terminal (106) without having a fixed base station. A portable communication device (106) used as a terminal is capable functioning as a router for communication (112, 118 and 114, 116) between other portable devices (102 and 104) in the system. While functioning as a router, the portable device (106) is capable establishing and maintaining a separate direct communication (302 and 304) with another portable communication device (306). A wireless communication system(600) utilizing predetermined cell- and location-specific communication parameters (808) and non-repeating propagation patterns (1200) for portables communication devices in the system for establishing communications.

23 Claims, 20 Drawing Sheets

100
112 118 106 114 116 108 110 102 104

VIRTUAL DYNAMIC CELLULAR INFRASTRUCTURE BASED ON COORDINATE INFORMATION

FIELD OF THE INVENTION

The present invention generally relates to a two-way wireless communication system and, more specifically, to a two-way wireless communication system capable of direct terminal-to-terminal communication, and indirect terminal-to-terminal communication through a terminal.

BACKGROUND OF THE INVENTION

In a common wireless communication system in which a user using a wireless terminal device is able to communicate with another user or is able to access a service provider such as e-mail or Internet provider, communication is established through a fixed base station. For example, in a cellular telephone system, if a first user wishes to reach a second user, the first user dials a telephone number on his cellular telephone identifying the second user's device, then his cellular telephone transmits a message to a nearby base station (first base station), where the first user's phone is currently registered, requesting to establish a call to the second user's device. The first base station then directs the call from the first user's terminal device to the second user's device. If the second user's device is another cellular telephone or another wireless device, then the first base station directs the call to a second base station where the second user's device is currently registered. If the second user was registered in the same cell as the first user, the first base station may function as a router and establish a call between the first and second users. However, this routing of the call through a base station is a requirement regardless of relative positions of the first and second users. Even if the first and second users are only one block apart and the nearest base station is ten miles away, the call still must be routed though the base station before reaching the user.

Another common wireless communication system is a paging system. In a one-way paging system, a caller typically enters an identification number of a specific pager by telephone or by internet web page, either directly or through a provider's service center, and enters the number or message to be sent to the pager. The call reaches the provider's paging system identifying the pager to be paged and the message to be sent. The provider's system then activates some or all of its paging base stations, and transmits the message to the pager. However, the person receiving the message on the pager still needs another communication system such as a telephone in order to return a reply message. To overcome this shortcoming, a two-way paging system, where a pager itself can originate a message and can transmit it to another pager, has been proposed as described in U.S. Pat. No. 5,335,246.

However, the above mentioned systems are based on an infrastructure, such as base stations and telephone lines that are fixed in location and are provided by service providers, and do not allow establishing direct terminal-to-terminal communication. A terminal device used in a system, such as cellular telephone or paging system, is capable of transmitting and receiving signals but it is unable to function as a router. If there were no base station available within the range of the users, the users are unable to communicate with each other even if they are only separated by a short distance. Another shortcoming associated with the above-mentioned systems is a lack of relative and/or absolute location information of the parties or terminal devices. Normally, the first party, who originates a call or page, does not know the location of the second party.

A direct portable-to-portable communication capability of a two-way radio such as a walkie-talkie is also limited that no location information is available and the range of communication is limited to the range of one walkie-talkie. It does not offer benefit derived from having an infrastructure.

Accordingly, it would be desirable to be able to provide an infrastructure capable of establishing direct communication between terminal devices without requiring a fixed base station. Such infrastructure would be capable of providing a user's or terminal device's location, and capable of using a terminal device as a router based on its position relative to other terminal devices so that the router aids in establishing communication between terminal devices that are separated beyond direct connection distance. The router would also be able to establish communication between a terminal and other service access point providing services such as e-mail and Internet, which may be located beyond direct connection distance.

SUMMARY OF THE INVENTION

The present invention provides a system and a method for a wireless communication system capable of establishing direct terminal-to-terminal communication and indirect terminal-to-terminal communication through a terminal. A portable communication device is typically used as a terminal in a communication system. The present invention can be operated as an independent system or can be operated to compliment existing systems such as cellular telephone system and paging system. The wireless communication system of the present invention has cells defining geographical areas and portable communication devices in cells, provides location information to portable communication devices in each cell, and has a specific communication scheme used by portable communication devices for each cell. Each portable communication device is capable of functioning as a router to establish communication between other portable communication devices as well as being capable of establishing communication directly to another portable communication device. Each cell is defined in multiple sections to allow non-repeating patterns for out-of-cell communication.

DETAILED DESCRIPTION OF PREFERRED EMBODIMENTS

The present invention provides a system and a method for a wireless communication system capable of establishing direct terminal-to-terminal communication and indirect terminal-to-terminal communication through a terminal. The present invention can be operated as an independent system or can be operated to compliment existing systems such as cellular telephone system and paging system.

Figure 1:
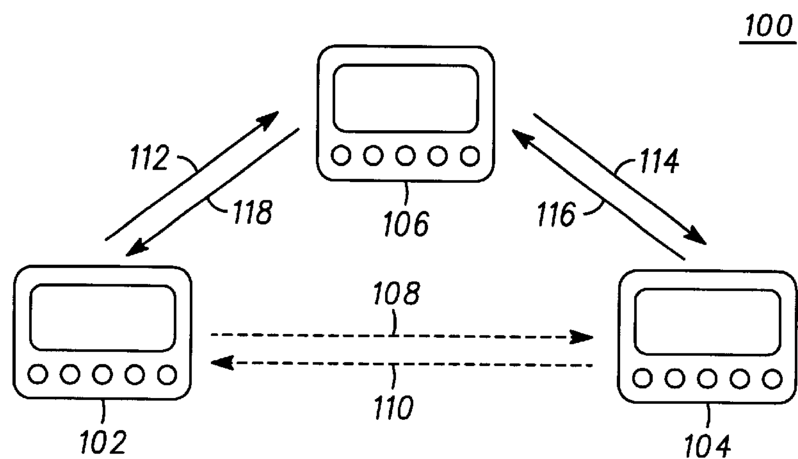
FIG. 1 is an exemplary block diagram of a wireless communication system according to a first preferred embodiment of the present invention.

A block diagram representation of a wireless communication system in accordance with a first preferred embodiment of the present invention is illustrated in FIG. 1. A wireless communication system (100) comprises first (102), second (104) and third (106) portable communication devices operating in synchronization. Each portable communication device has a transceiver for communication at a particular frequency band that is compatible with each other and is used for both transmitting and receiving signals. The first portable communication device (102) is capable of establishing direct portable-to-portable communication with the second portable communication device (104), and is also capable of establishing indirect communication to the second portable device (104), which is beyond the direct communication range, by configuring the third portable communication device (106) as a router to extend the communication range. To establish direct communication with the second portable communication device (104), the first portable communication device (102) transmits (108) a first message to the second portable communication device (104). If the second portable communication device (104) successfully receives the first message, the communication is established and the second portable communication device (104) transmits (110) an acknowledgement to the first portable communication device (102). However, if the second portable communication (104) device does not successfully receive the first message, it does not send the acknowledgement. The first portable communication device (102) then acquires the third portable communication device (106), transmits (112) a second message to the third portable communication device (106), and instructs the third portable communication device (106) to re-transmit (114) the second message to the second portable communication device (104). If the second portable communication device (104) successfully receives the second message, the communication is established and the second portable communication device (104) transmits an acknowledgement (116) to the third portable communication device (106), and instructs the third portable communication device (106) to re-transmit (118) the acknowledgement to the first portable communication device (102).

Figure 2:
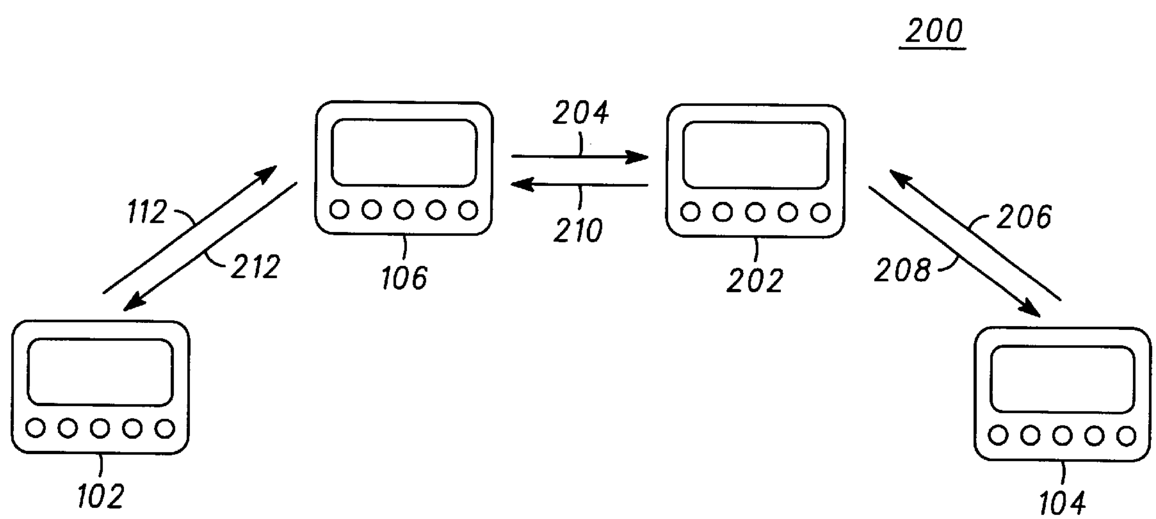
FIG. 2 is an exemplary block diagram of a wireless communication system according to a second preferred embodiment of the present invention showing two routers in series.

However, if the third portable communication device (106) fails to receive an acknowledgement (116) from the second portable communication device (104), then the third portable communication device (106) may acquire a fourth portable communication device (202) having a transceiver for communication at a particular frequency band that is compatible with the first, second, and third portable communication device (102, 104, and 106, respectively) as illustrated in FIG. 2. The third portable communication device (106), functioning as a first router, re-transmits (204) the second message to the fourth portable communication device (202), functioning as a second router, and instructs the fourth portable communication device (202) to transmit (206) the second message to the second portable communication device (104). If the second portable communication device (104) successfully receives the second message, communication is established and the second portable communication device (104) transmits an acknowledgement (208) to the fourth portable communication device (202) which instructs the fourth portable communication device (202) to re-transmit (210) the acknowledgement to the third portable communication device (106) which instructs the third portable communication device (106) to re-transmit (212) the acknowledgement to the first portable communication device (102). If the second portable communication device (202) still fails to transmit an acknowledgement, then the process, having the last router acquire another portable communication device and instruct it to re-transmit the message, repeats until the second portable communication device (202) transmits an acknowledgement, or repeats until a predetermined number of routers has been reached in order to avoid an unending re-transmission.

Figure 3:
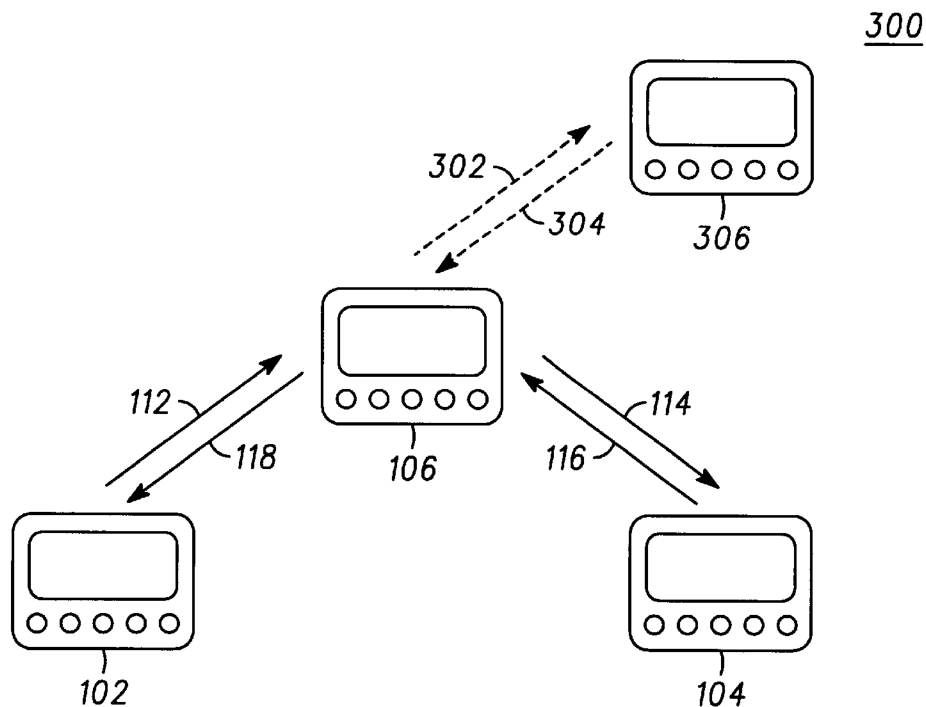
FIG. 3 is an exemplary block diagram of a wireless communication system according to a third preferred embodiment of the present invention showing one router also functioning as a normal portable.

As illustrated in FIG. 3, while functioning as a router, the third portable communication device (106) is still capable of establishing a separate direct portable-to-portable communication (302, 304) with a fourth portable communication device (306) having a transceiver for communication at a particular frequency band that is compatible with the first, second, and third portable communication device (102, 104, and 106, respectively). By employing a multiple-slot modulation scheme such as a frequency hopping spread spectrum (FHSS), the third portable communication device (106) is able to function as a router (112, 114, and 116, 118) for the first and second communication devices (102 and 104, respectively) using one slot, and still be able to establish the separate direct communication (302, 304) with the fourth portable communication device (306) using another slot.

Figure 4:
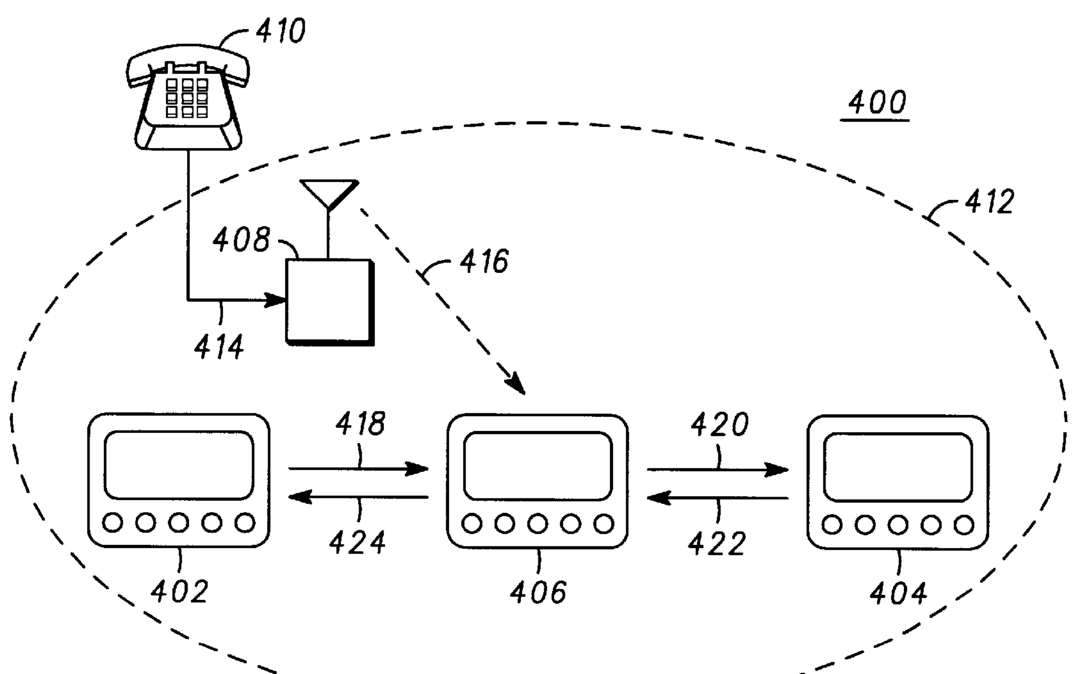
FIG. 4 is an exemplary block diagram of a wireless communication system according to a fourth preferred embodiment of the present invention complementing an existing infrastructure.

Each of the preferred embodiments of the wireless communication system according to the present invention so far described has been an independent system without a fixed base station or a wired infrastructure. However, another aspect of the wireless communication system according to the present invention is an enhancement to an existing infrastructure. FIG. 4 illustrates a fourth preferred embodiment of the wireless communication system (400) according to the present invention complementing an existing infrastructure. Each of a plurality of portable communication devices in the wireless communication system (400) functions as a portable unit of the existing infrastructure. First, second, and third portable communication devices (402, 404, and 406, respectively) of the plurality of portable communication devices are shown in FIG. 4. A base station (408), being a component of the existing infrastructure such as a cellular phone system or a paging system, is connected to a wire communication system such as a landline based telephone system (410). The base station (408) is capable of communicating with any of the plurality of portable communication devices that are within the communication range (412) of the base station (408). As a function of the existing infrastructure, a caller, by using the telephone system (410), is able to establish communication (414, 416) with the third portable communication device (406) through the base station (408). An enhancement to the existing infrastructure is provide by enabling the caller using the telephone system (410) to establish communication (414, 416) with the third portable communication device (406) through the base station (408) while the third portable communication device (406) is functioning as a router (418, 420, and 422, 424) for the first and the second portable communication devices (402 and 404, respectively). The communication (416) from the base station (408) to the third portable communication device (406) is accomplished employing the communication protocol utilized in the existing infrastructure. Depending on the infrastructure, such as paging or cellular telephone infrastructure, in which the wireless communication system according to the present invention is deployed, the protocol used in the existing infrastructure may be paging, time-division-multiple-access (TDMA), code-division-multiple-access (CDMA), or global-system for mobile (GSM) protocol. Whereas each portable communication device employs a multiple-slot modulation scheme such as a frequency hopping spread spectrum (FHSS), to communicate to each other.

Figure 5:
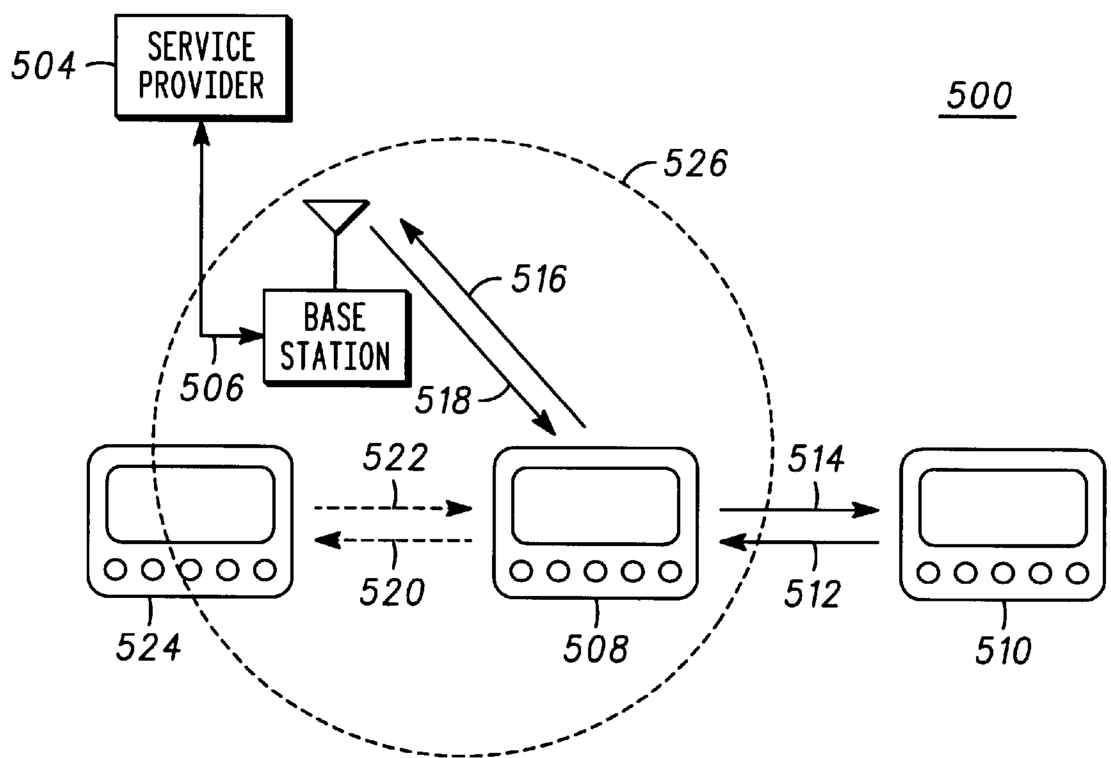
FIG. 5 is an exemplary block diagram of a wireless communication system according to a fifth preferred embodiment of the present invention further enhancing the system by providing transceivers compatible with an existing infrastructure and compatible with a service provider connected to the infrastructure.

FIG. 5 illustrates a fifth preferred embodiment of the wireless communication system (500) according to the present invention, further enhancing the system described in the fourth preferred embodiment, by providing a transceiver that is compatible with the transceivers of the portable communication devices with the base station (502). The base station (502) is connected to a service provider (504) such as an Internet provider, and is capable of exchanging information with the service provider (504) by way of an existing network (506) such as a telephone network. A first portable communication device (508) of a plurality of portable communication devices in the wireless communication system (500) is capable of establishing communication with the service provider (504) through the base station (502). In addition, because each of the plurality of portable communication devices is capable of functioning as a router as previously described, a second portable communication device (510) is also able to access the service provider (504) by establishing communication (512, 514) with the first portable communication device (508), and using the first portable communication device (508) as a router communicating (516, 518) with the base station (502). While functioning as a router, the first portable communication device (508) is capable of establishing a separate independent communication (520, 522) with a third portable communication device (524).

Figure 6:
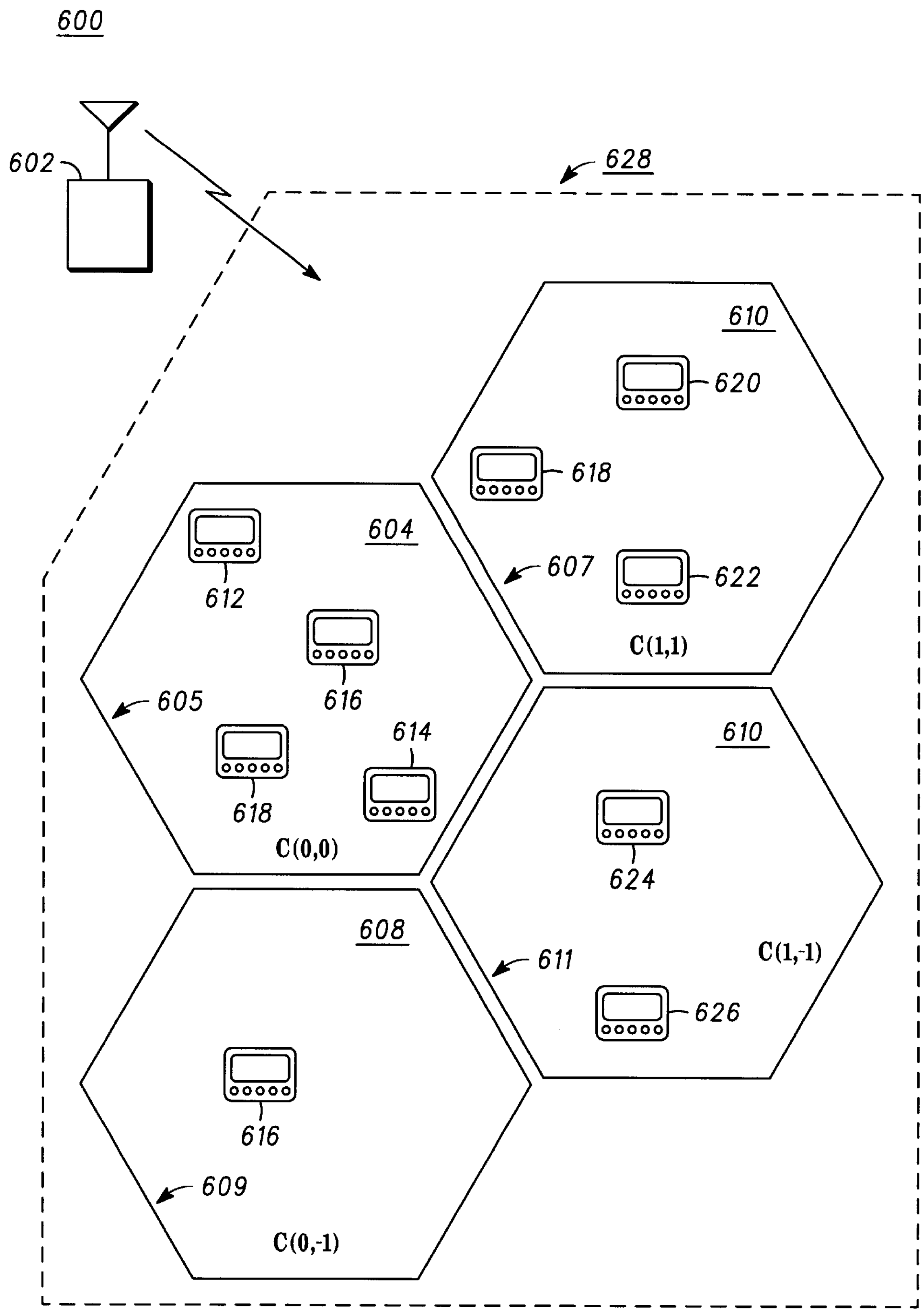
FIG. 6 is an exemplary block diagram of a wireless communication system according to a sixth preferred embodiment of the present invention illustrating geographically scattered portable communication devices.

An exemplary block diagram representation of a wireless communication system (600) in accordance with a sixth preferred embodiment of the present invention is illustrated in FIG. 6. The wireless communication system (600) comprises a positioning system (602) such as Global Positioning System (GPS) and a plurality of portable communication devices scattered over some area. Each of the plurality of portable communication devices has a transceiver for communication at a particular frequency band that is compatible with each other such as a frequency hopping spread spectrum (FHSS) transceiver, and a positioning system receiver such as a GPS receiver. Geographical area where the wireless communication system (600) is deployed is partitioned into multiple cells with each cell defined by its cell boundary line, and with one cell defined as a reference cell whose coordinate is used by all other cells as a reference (four cells, 604 having cell boundary line 605, 606 having cell boundary line 607, 608 having boundary cell line 609, and 610 having cell boundary line 611 are shown in FIG. 6). Each cell has a specific coordinate defining its geographical area and its position relative to the reference cell. In FIG. 6, cell 604 is shown as the reference cell having a cell coordinate of C(0, 0). Cell 606, having a cell coordinate C(1, 1), is located relative to the reference cell one cell away in the positive x-axis direction and one cell away in the positive y axis direction. Similarly, Cell 608 has a cell coordinate C(0, −1) and Cell 610 has a cell coordinate C(1, −1), each describing its location relative to the reference cell 604. Each cell has a predetermined set of communication parameters assigned to it to be used within the cell by a potable communication device. First, second, third, and fourth portable communication devices (612, 614, 616, and 618, respectively) of the plurality of portable communication devices are shown in FIG. 6 within a first cell (604). The wireless communication system (600) may be a part of an existing wireless network (628) such as a paging system or cellular telephone network with each of the plurality of portable communication devices also being capable of operating in the existing wireless network (628).

Figure 7:
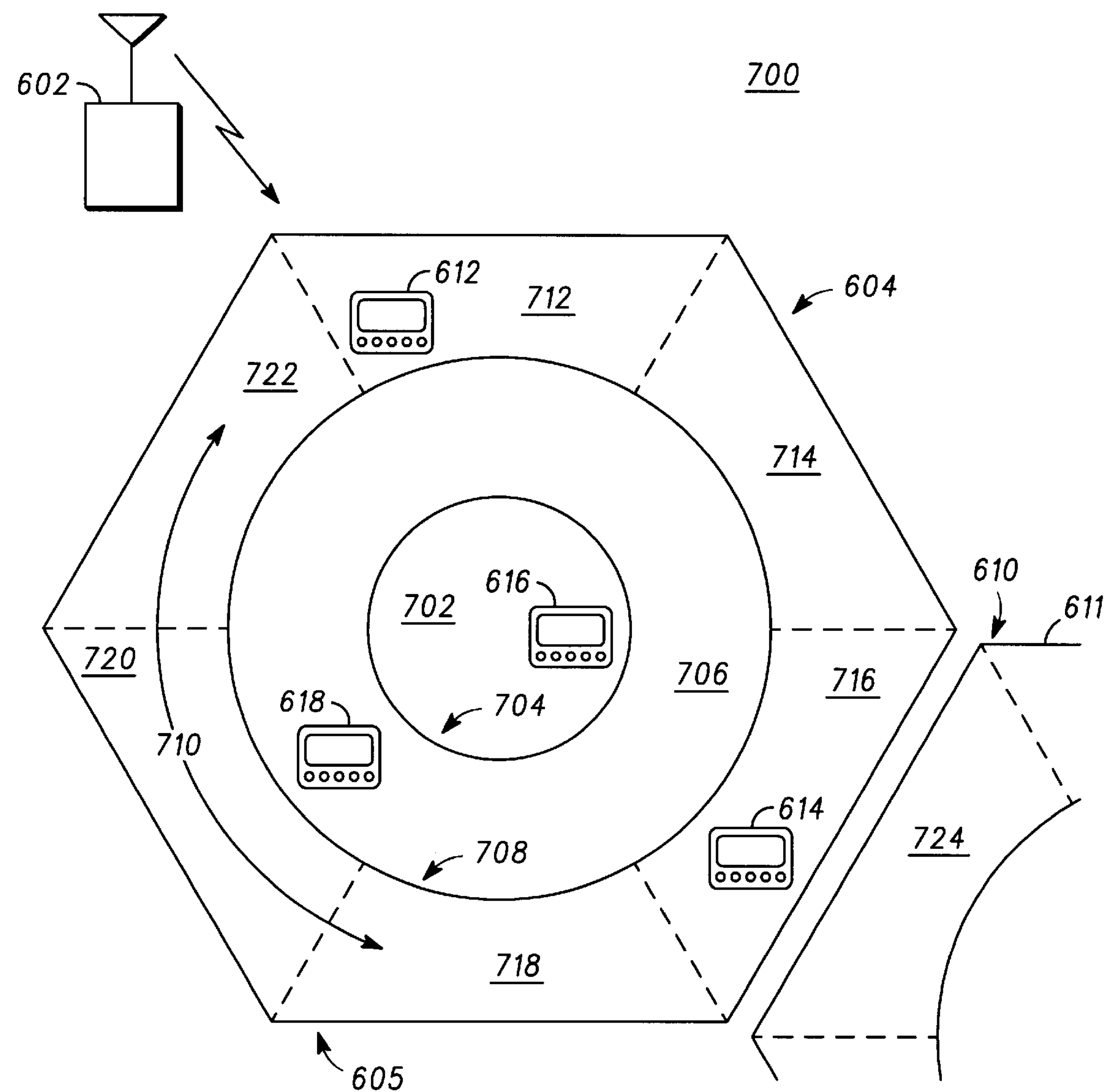
FIG. 7 is an exemplary block diagram of cell 604 and adjacent cell 610 of FIG. 6.

FIG. 7 illustrates an exemplary division of each cell into three regions, each region having a specific set of parameters to be used by the portable communication devices further defining their functions in the region. Each portable communication device updates its location information via GPS periodically as it may move from one cell to another, or from one region to another within the same cell, and the role of the portable communication device in the wireless communication system (600) is determined based on its location. The GPS may help establish synchronization for portable communication devices to work properly in the wireless communication system (600).

A central region (702) is defined by a first boundary line (704), and portable communication devices that are located within the central region (one shown 616) are classified as center boundary units (CBUs). The CBUs are responsible for relaying messages across the cell when a direct communication between two portable communication devices within the same cell is not established. CBUs are also capable of generating and receiving their own messages as previously described portable communication devices in the system. When a portable communication device enters into the central region (702) and receives GPS information, the portable communication device identifies itself as a CBU and based on its current GPS information registers itself to the wireless communication system (600) as a CBU, and periodically transmits its location, identification, and duration as a CBU. To avoid depleting a cell of CBUs, a first portable communication device functioning as a CBU must be replaced by a second portable communication device which has been registered as a CBU before the first portable communication devices stops functioning as a CBU unless the first portable unit leaves the center boundary. For example, in FIG. 7, if the first portable communication device (616) leaves the central region (702), it may stop functioning as a CBU. However, the first portable communication device may not stop functioning as a CBU due to the amount of time it has been a CBU or power requirements unless a replacement has been registered. When a CBU is connected to a battery, it identifies itself and registers to the wireless communication system (600) as a reliable static center boundary unit (RSCBU), and may function as a CBU for a longer period of time.

A second region (706) is defined by the first boundary line (704) and a second boundary line (708), and portable communication devices that are located within the second region (one shown 618) are classified as regular portable units (RPUs). A portable communication device determines its classification based on its location through GPS. RPUs are capable of generating and receiving their own messages as previously described portable communication devices in the system but unlike CBUs, RPUs are not responsible for relaying messages.

An outer region (710) is defined by the second boundary line (708) and the cell boundary line (605), and portable communication devices that are located within the outer region (two shown 612 and 614) are classified as outer boundary units (OBUs). The cell (604) is further divided into six sectors, S1, S2, S3, S4, S5, and S6 (712, 714, 716, 718, 720, and 722, respectively), and a portable communication unit in the outer region determines its classification and its sector location based on its location through GPS. Each sector is located adjacent to another sector of an adjacent cell (sector 716 of cell 604 and sector 724 of cell 610 are shown). OBUs are capable of generating and receiving their own messages as previously described portable communication devices in the system. The OBUs are responsible for relaying messages to the adjacent cell. When a portable communication device enters into the outer region (710) and receives GPS information, the portable communication device identify itself as an OBU based on its current GPS information registers itself to the wireless communication system (600) as an OBU, and periodically transmits its location and identification an OBU.

Figure 8:
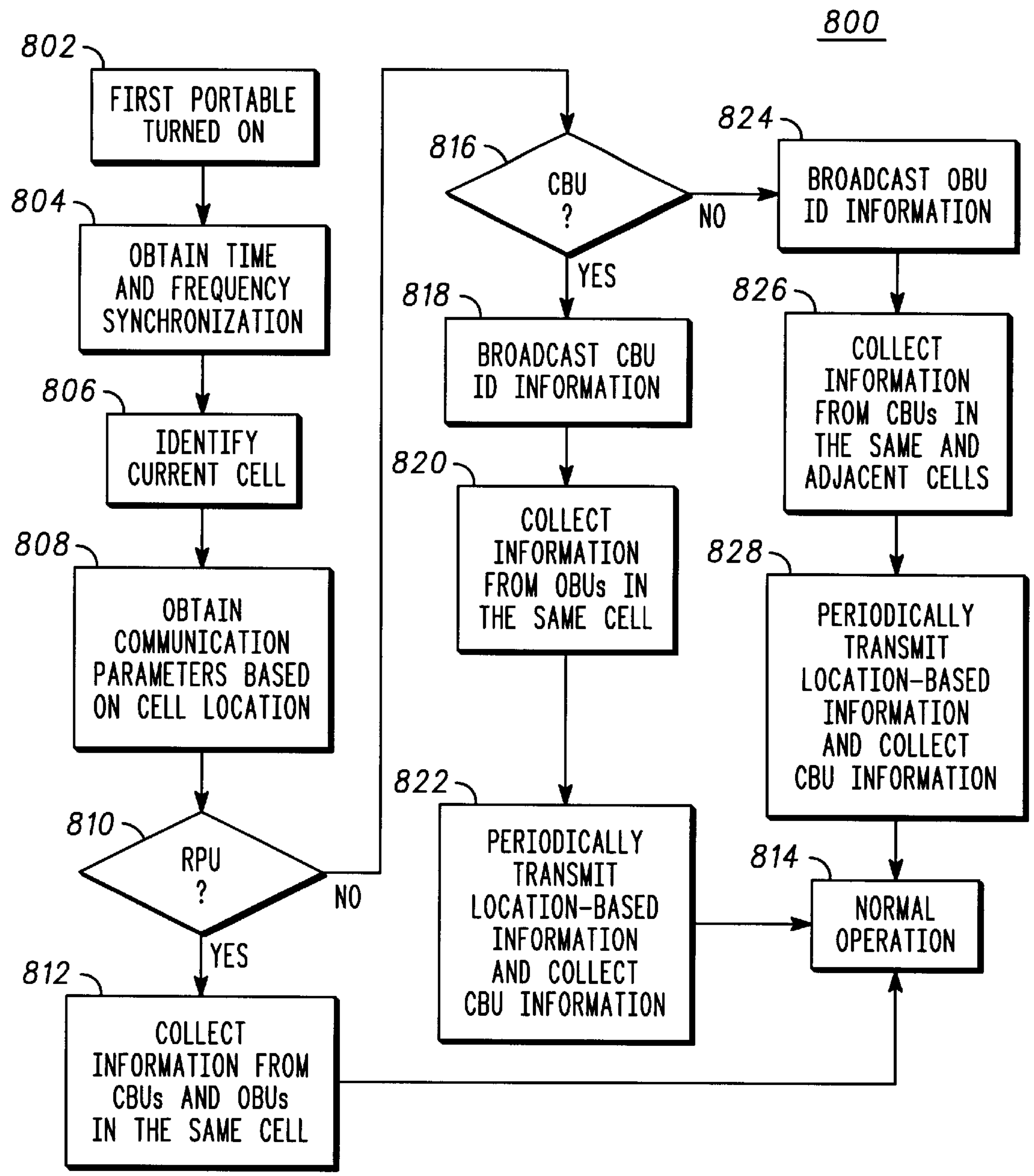
FIG. 8 is an exemplary flowchart illustrating how the first portable communication device attempts to register to the wireless communication system.

FIG. 8 illustrates an exemplary flowchart (800) describing how the first portable communication device (612) may register itself to the wireless communication system (600) and identify its function appropriately.

In step 802, the first portable communication device (612) is turned on, and then in step 804, it obtains the time and frequency synchronization information from the positioning system (602). In step 806, the first portable communication device (612) also identifies the cell in which it is currently located based on the information received from the positioning system (602). In step 808, the first portable communication device (612) further obtains the communication parameters that are predetermined and are specific to the cell in which it is currently located. In step 810, the first portable communication device (612) determines whether to function as an RPU based on which region of the cell in which it is currently located. If the first portable communication device (612) determines to function as an RPU, then it collects information from CBUs and OBUs that are located in the same cell as itself (812) as shown in step 812, and then proceeds to function normally as shown in step 814.

However, if the first portable communication device (612) determines not to function as an RPU, then it, as in step 816, determines whether to function as a CBU based on which region of the cell it is currently located. If the first portable communication device (612) determines to function as a CBU, then it broadcasts and identifies itself as a CBU in step 818, collects information from OBUs that are located in the same cell as itself in step 820. In step 822, the first portable communication device (612) periodically transmits its location based information and collects OBU information, and then proceeds to function normally in step 814.

However, if the first portable communication device (612) determines not to function as a CBU, then it functions as an OBU, broadcasts and identifies itself as an OBU in step 824. The first portable communication device (612) then collects information from CBUs that are located in the same cell as itself and from CBUs that are located in the adjacent cells in step 826. The first portable communication device (612) periodically transmits its location based information and collects CBU information in step 828, and then proceeds to function normally in step 814.

Figure 9:
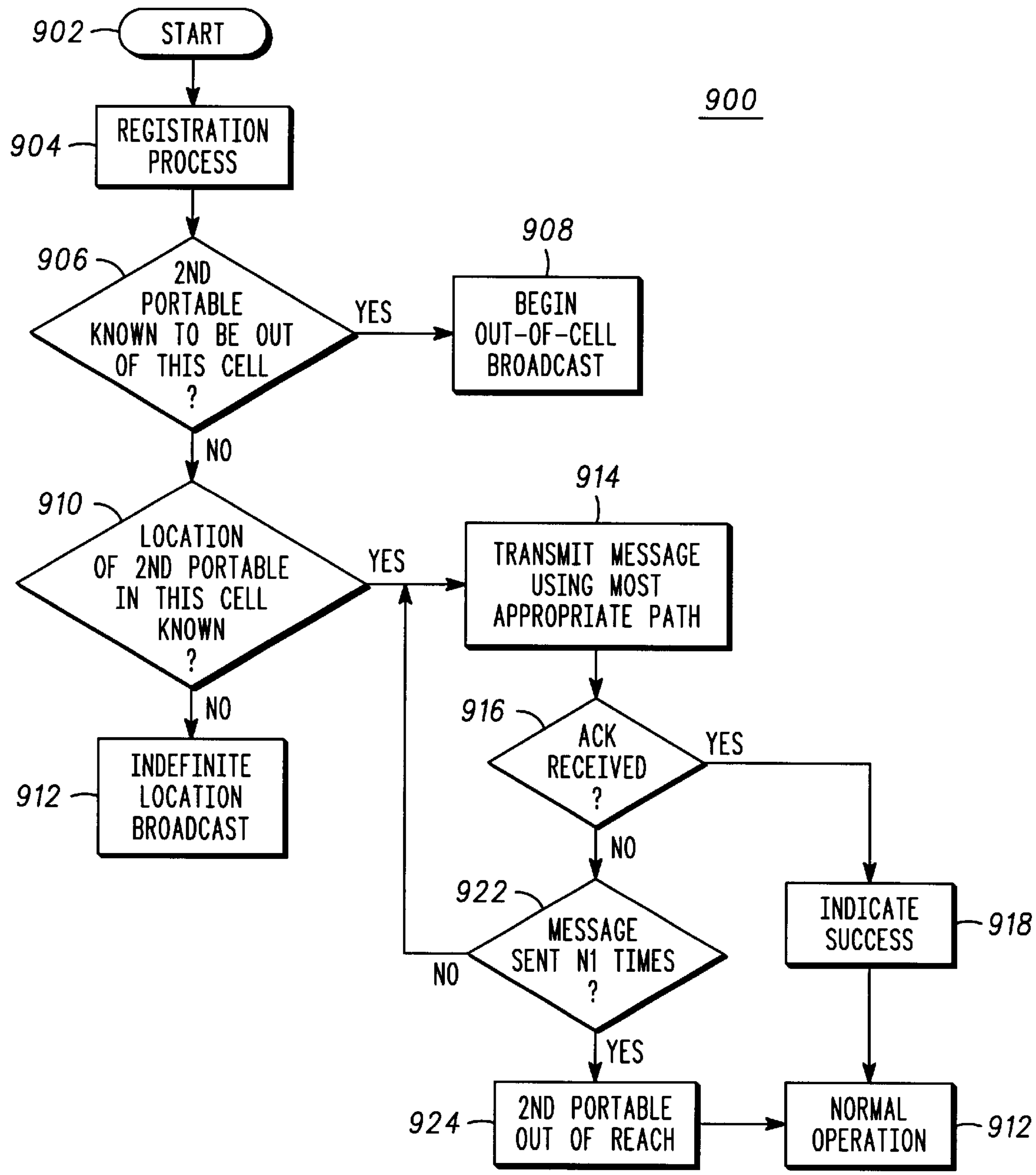
FIG. 9 is an exemplary flowchart illustrating how the first portable communication device attempts to establish communication with the second portable communication device within the same cell with its location known.
Figure 10:
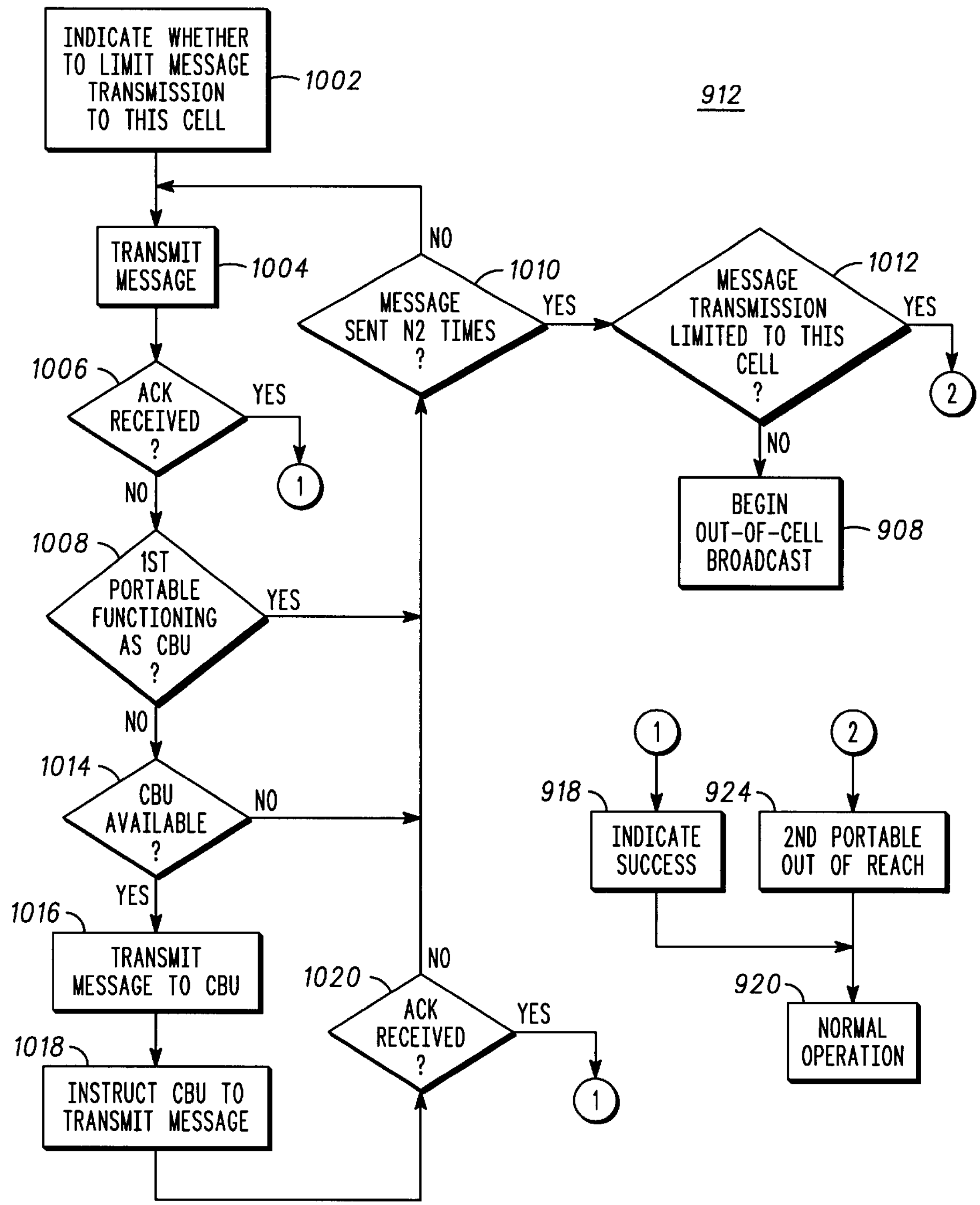
FIG. 10 is an exemplary flowchart illustrating how the first portable communication device attempts to establish communication with the second portable communication device within the same cell with its location unknown.

FIGS. 9 and 10 illustrate exemplary flowcharts (900 and 1000) describing how the first portable communication device (612) in the first cell (604) attempts to establish communication with the second portable communication device (614) within the same cell (604).

FIG. 9 illustrates how the attempt is differentiated based on the knowledge of the location of the second portable communication device (614) within the same cell (604), and illustrates an exemplary method when the location of the second portable communication device (614) within the same cell (604) is known. In step 902, when the first portable communication device (612) is turned on, the first portable communication device (612) goes through the registration process in step 904 as described in FIG. 8. When the user of the first portable communication device (612) enters a message and identifies the second portable communication device (614) as a recipient, the first portable communication devices (612) determines in step 906 whether the location of the second portable communication device (614) is known to be outside of the first cell (604). If the first portable communication devices (612) so determines, then it begins the out-of-cell broadcast process in step 908. Otherwise, the first portable communication device (612) determines whether the location of the second portable communication device (614) within the first cell is known in step 910. If the location of the second portable communication device (614) within the first cell (604) is not known, the first portable communication device (612) begins the indefinite location broadcast process in 912. If the location of the second portable communication device (614) within the first cell (604) is known, then the first portable communication device (612) transmits the message using the most appropriate path in step 914. The most appropriate path may be a direct path or a previously used path that successfully established communication with the second portable. For example, if the last time the first portable communication device (612) successfully established communication with the second portable communication lo device (614) was by way of devices 612 to 616 to 614, then first portable communication device transmits the message using this path. In step 916, the first portable communication device (612) then waits to receive an acknowledgement (ACK) from the second portable device of the message reception for predetermined time to avoid waiting for the ACK indefinitely. An ACK may include, in addition to an actual acknowledgement of the message reception, the time of reception, the location of the second portable device, the message path, and other desired information. If the first portable communication device (612) receives an ACK within the predetermined time, then in step 918, it indicates that the message was successfully received, and resumes its normal operation in step 920. The user of the first portable communication device (612) may start preparing a new message, and repeat the process from step 906. If the first portable communication device (612) does not receives an ACK within the predetermined time, then in step 922, it checks whether the message has been transmitted a predetermined number (N1) of times. If N1 has not been exceeded, then the first portable communication device in step 914 re-transmits the message using the most appropriate path. If N1 has been reached, then the second portable communication device is treated as out-of-reach in step 924 and the first portable communication device resumes its normal operation in step 920. The user may start preparing a new message, and repeat the process from step 906.

FIG. 10 illustrates an exemplary method when the location of the second portable communication device (614) within the first cell (604) is not known, and the first portable communication device (612) begins the indefinite location broadcast process in step 912. In step 1002, the user of the first portable communication device (612) chooses a message status between broadcasting the message only within the first cell (604) or broadcasting to other cells if the second portable communication device (614) is not reached within the first cell (604), and the message is appropriately marked to indicate the user's choice. In step 1004, the first portable communication device (612) transmits the message directly targeting the second portable communication device (614), then in step 1006, waits to receive an ACK from the second portable communication device (614) of the message reception for a predetermined time. If the first portable communication device (612) receives an ACK within the predetermined time, then in step 918, it indicates that the message was successfully received, and resumes its normal operation in step 920. The user may start preparing a new message, and repeat the process from step 906.

If the first portable communication device (612) does not receive an ACK within the predetermined time, then it, in step 1008, determines whether it is functioning as a CBU If the first portable communication device (612) determines that it is functioning as a CBU then in step 1010, it checks whether the message has been transmitted a predetermined number (N2) of times. If N2 has not been exceeded, then in step 1004, the first portable communication device re-transmits the message directly targeting the second portable communication device (614). If N2 has been reached, then in step 1012, the first portable communication device (612) checks the message status. If the message status shows that the broadcasting is limited within the first cell (604), then the second portable communication device is treated as out-of-reach in step 924 and the first portable communication device resumes its normal operation in step 920. The user may start preparing a new message, and repeat the process from step 906. If the message status shows that the broadcasting is to continue to other cells if the second portable communication device (614) is not reached within the first cell (604), then it begins the out-of-cell broadcast process in step 908.

If the first portable communication device (612) determines that it is not functioning as a CBU, then it searches for a first CBU to be used as a router in step 1014. If no CBU is available to be used as a router, in step 1010, the first portable communication device (612) determines whether the message has been transmitted a predetermined number (N2) of times. If N2 has not been exceeded, then in step 1004, the first portable communication device re-transmits the message directly targeting the second portable communication device (614). If N2 has been reached, then the first portable communication device (612) checks the message status in step 1012. If the message status shows that the broadcasting is limited within the first cell (604), then the second portable communication device is treated as out-of-reach in step 924 and the first portable communication device resumes its normal operation in step 920. The user may start preparing a new message, and repeat the process from step 906. If the message status shows that the broadcasting is to continue to other cells if the second portable communication device (614) is not reached within the first cell (604), then it begins the out-of-cell broadcast process in step 908.

If a first CBU (616) is available to be used as a router, then the first portable communication device (612) transmits the message to the first CBU (616) in step 1016, and instructs the first CBU (616) to re-transmit the message to the second portable communication device (614) in step 1018. Then, in step 1020, the first portable communication device (612) waits to receive an ACK from the second portable communication device (614) of the message reception through the first CBU (616) for a predetermined time. If the first portable communication device (612) receives an ACK within the predetermined time, then it indicates that the message was successfully received in step 918, and resumes its normal operation in 920. The user may start preparing a new message, and repeat the process from step 906. If the first portable communication device (612) does not receive an ACK within the predetermined time, then, in step 1010, it checks whether the message has been transmitted a predetermined number (N2) of times. If N2 has not been exceeded, then the first portable communication device re-transmits the message directly targeting the second portable communication device (614) in step 1004. If N2 has been reached, then the first portable communication device (612) checks the message status in step 1012. If the message status shows that the broadcasting is limited within the first cell (604), then the second portable communication device is treated as out-of-reach (924) and the first portable communication device resumes its normal operation in step 920. The user may start preparing a new message, and repeat the process from step 906. If the message status shows that the broadcasting is to continue to other cells if the second portable communication device (614) is not reached within the first cell (604), then it begins the out-of-cell broadcast process in step 908.

Figure 11:
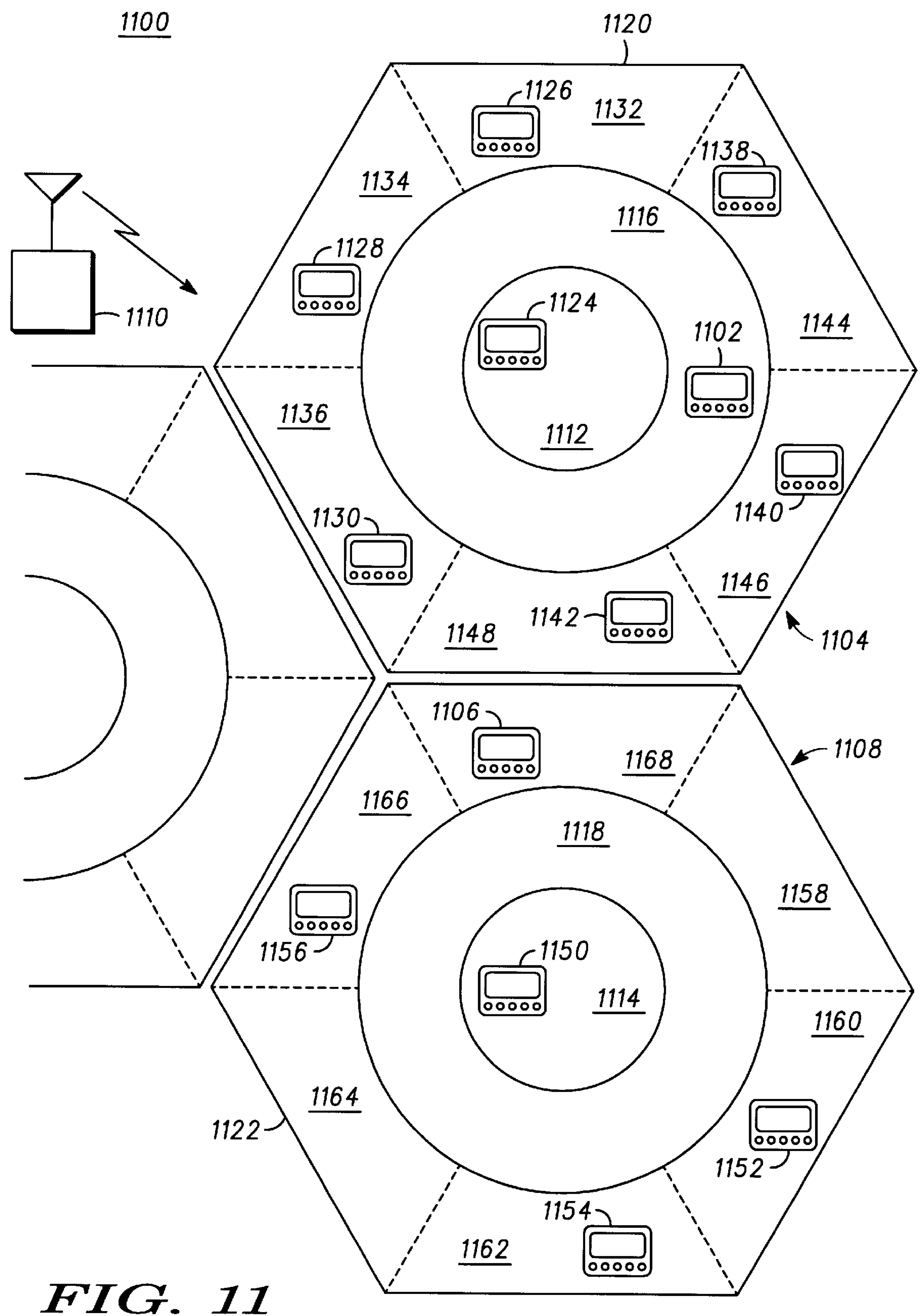
FIG. 11 is an exemplary block diagram of a wireless communication system according to a seventh preferred embodiment of the present invention illustrating geographically scattered portable communication devices for communicating between cells.

FIG. 11 illustrates an exemplary block diagram representation of a wireless communication system (1100) according to a seventh preferred embodiment of the present invention of a setup for an out-of-cell broadcast in step 908. A first portable communication device (1102) of a plurality of portable communication devices located in a first cell (1104) attempts to establish communication with a second portable communication device (1106) of the plurality of portable communication devices located in a second cell (1108). As previously illustrated, the wireless communication system (1100) comprises a positioning system (1110) such as Global Positioning System (GPS) and the plurality of portable communication devices scattered over some area. Each of the plurality of portable communication devices has a transceiver for communication at a particular frequency band that is compatible with each other such as a frequency hopping spread spectrum (FHSS) transceiver, and a positioning system receiver such as a GPS receiver. Geographical area where the wireless communication system (1100) is deployed is partitioned into multiples cells (two cells, 1104 and 1108 are shown in FIG. 11). Each cell has a central region (1112, 1114) around a center, a second region (1116, 1118) surrounding the central region (1112, 1114) and an outer region surrounding the second region within the boundary (1120, 1122), and the outer region is divided into six sectors, each of which is adjacent to a different cell. Each portable communication device is classified as a center boundary unit (CBU), a reliable static center boundary unit (RSCBU), a regular portable unit (RPU), or an outer boundary unit (OBU) depending on its current location, and may register itself as such in an existing wireless network.

Figure 12:
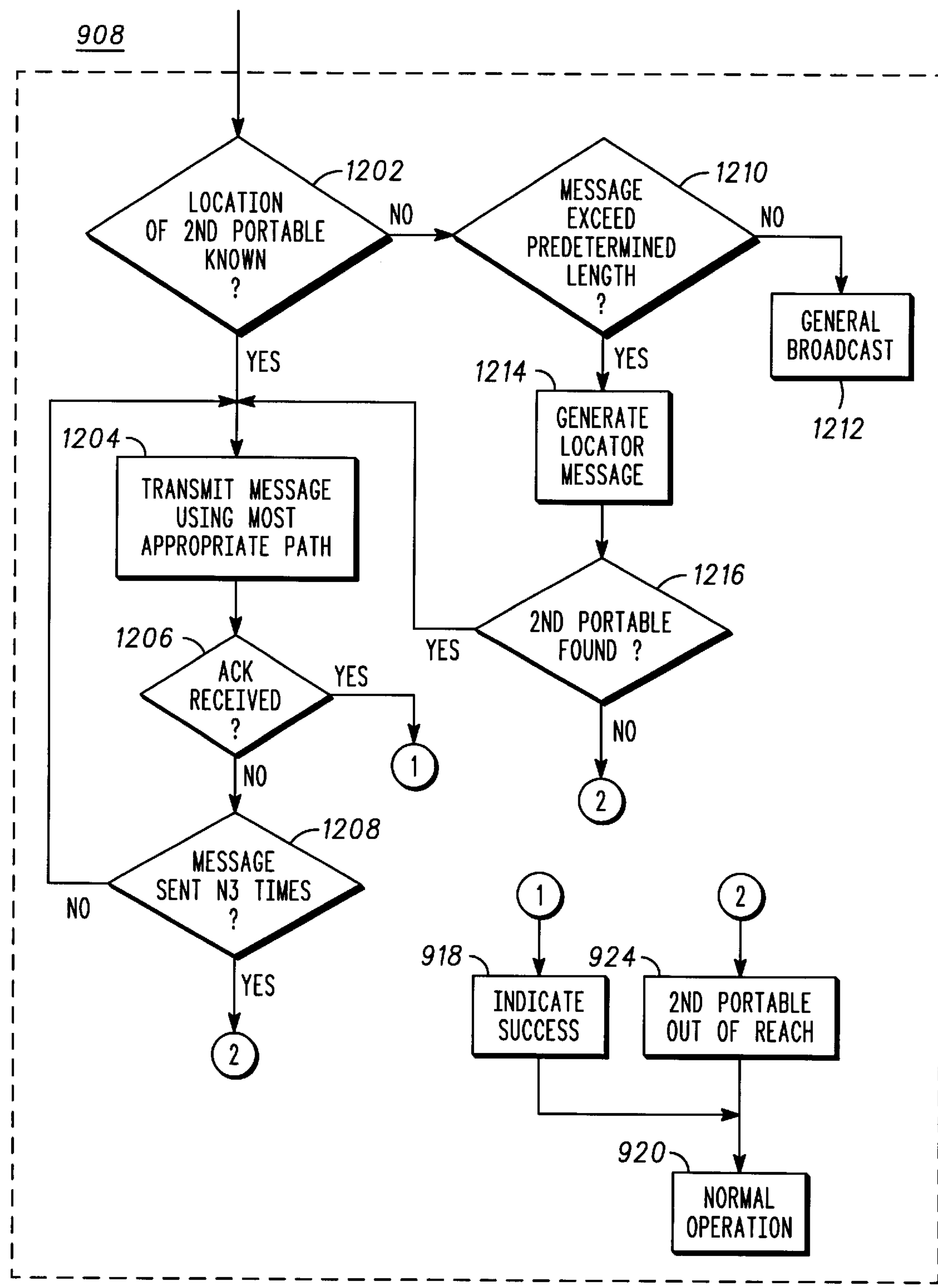
FIG. 12 is an exemplary flowchart illustrating an out-of-cell broadcast process.

FIG. 12 is a flowchart describing an exemplary process of the out-of-cell broadcast of step 908. Once the first portable communication device (1102) determines that the out-of-cell broadcast is desired, it first determines if the location of the second portable communication device (1106) is known in step 1202. If it is known, then in step 1204, the first portable communication device (1102) transmits the message using the most appropriate path which may be a direct path or a previously used path that successfully established communication with the second portable (1106). Then, in step 1206, the first portable communication device (1102) waits to receive an acknowledgement (ACK) from the second portable device (1106) of the message reception for predetermined time to avoid waiting for the ACK indefinitely. An ACK may include, in addition to an actual acknowledgement of the message reception, the time, of reception, the location of the second portable device, the message path, and other desired information. If the first portable communication device (1102) receives an ACK within the predetermined time, then it indicates that the message was successfully received in step 918, and resumes its normal operation in step 920. The user of the first portable communication device (1102) may start preparing a new message, and repeat the process from step 906. If the first portable communication device (1102) does not receive an ACK within the predetermined time, then it checks whether the message has been transmitted a predetermined number (N3) of times in step 1208. If N3 has not been exceeded, then the first portable communication device (1102) re-transmits the message using the most appropriate path in step 1204. If N3 has been reached, then the second portable communication device (1106) is treated as out-of-reach in step 924 and the first portable communication device (1102) resumes its normal operation in step 920. The user may start preparing a new message, and repeat the process from step 906. Alternatively, the user may choose to treat the location of the second portable communication device (1106) as unknown.

Figure 13:
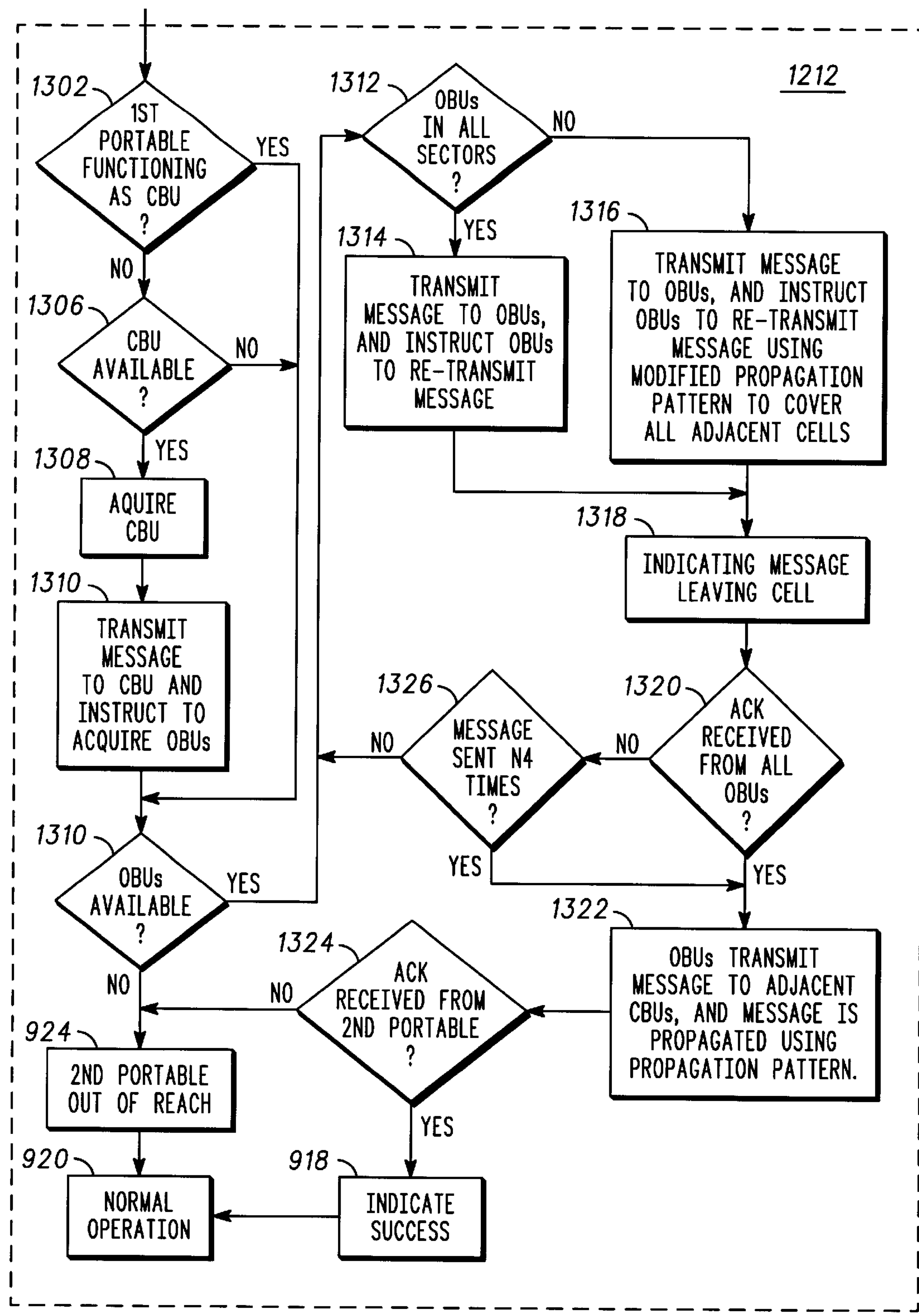
FIG. 13 is an exemplary flowchart illustrating a general broadcast process.

If the location of the second portable communication device (1106) is not known, then the first portable communication device (1102) checks the length of the message against a predetermined length in step 1210. If the message length is less than the predetermined length, or the message has less than a predetermined number of characters, then, in step 1212, the first portable communication device transmits the message by general broadcast. FIG. 13 illustrates an exemplary flowchart of the general broadcast in step 1212.

When the first portable communication device (1102) begins the general broadcast in step 1212, it first determines if it is functioning as a CBU in step 1302. If the first portable communication device (1102) so determines, then it searches for available OBUs in step 1304.

If the first portable communication device (1102) determines that it is not functioning as a CBU in step 1302, it then searches for an available CBU in step 1306. If it finds no available CBU, then the first portable communication device (1102) searches for available OBUs in step 1304. If the first portable communication device (1102) finds a CBU, it acquires the CBU in step 1308. The first portable communication device (1102) transmits the message to the CBU and instructs the CBU to search for available OBUs in step 1310. The CBU then searches for available OBUs in step 1304.

If there are no available OBUs, then the second portable communication device (1106) is treated as out-of-reach in step 924 and the first portable communication device (1102) resumes its normal operation in 920.

If there is at least one OBU available, then the sector coverage is determined in step 1312. If there is an OBU available and is acquired in each sector, the message is transmitted to all acquired OBUs with an instruction for the OBUs to re-transmit the message out of the cell using a predetermined non-repeating out-of-cell propagation pattern in step 1314. If only some, but not all, of the sectors are covered by acquired OBUs, then the message is transmitted to all acquired OBUs with an instructions for the OBUs to re-transmit the message out of the cell in step 1316. The instruction may additionally instruct the OBUs to modify their predetermined out-of-cell propagation patterns to cover some of the sectors which have no available OBUs. The first portable communication device (1102) is notified that the message is transmitted beyond the cell boundary in step 1318.

Successful delivery of the message to all the acquired OBUs is determined by receiving acknowledgements (ACK) from the OBUs in step 1320. If ACKs from all the acquired OBUs are received, the OBUs transmit the message to the adjacent CBUs, and the message is propagated using an appropriate pattern in step 1322. The first portable communication device (1102) then waits for an ACK from the second portable communication device (1106) in step 1324. If the first portable communication device (1102) receives an ACK within the predetermined time, then it indicates that the message was successfully received in step 918, and resumes its normal operation in step 920. If the first portable communication device (1102) does not receive an ACK from the second portable communication device (1106) within the predetermined time, then the second portable communication device (1106) is treated as out-of-reach in step 924 and the first portable communication device (1102) resumes its normal operation in step 920. Alternatively, the first portable communication device may acquire a different set of OBUs or may acquire a different CBU and instruct it to acquire a different set of OBUs, and repeat the general broadcast process.

If only a subset of the acquired OBUs return an ACK, then the first portable communication device (1102) determines whether the message has been transmitted a predetermined number (N4) of times in step 1326. If N4 has not been exceeded, then the first portable communication device (1102) may partially repeat the general broadcast process. If N4 has been reached, then the message is re-transmitted only by the OBUs that have returned an ACK in step 1322. The first portable communication device (1102) then waits for an ACK from the second portable communication device (1106) in step 1324. If the first portable communication device (1102) receives an ACK within the predetermined time, then it indicates that the message was successfully received in step 918, and resumes its normal operation in step 920. If the first portable communication device (1102) does not receive an ACK from the second portable communication device (1106) within the predetermined time, then the second portable communication device (1106) is treated as out-of-reach in step 924 and the first portable communication device (1102) resumes its normal operation in step 920. Alternatively, the first portable communication device may acquire a different set of OBUs or may acquire a different CBU and instruct it to acquire a different set of OBUs, and repeat the general broadcast process.

If the message length exceeds the predetermined length, then the first portable communication device (1102) generates a locator message specifically for locating the second portable communication device (1106) in step 1214. The locator message is sent using the same method as the general broadcast of step 1212 to locate the second portable communication device (1106) in step 1216. Instead of receiving an ACK for a successful message delivery, if the locator message reaches the second portable communication device (1106), the first portable communication device (1102) receives a successful path that the message took to reach the second portable communication device (1106) which the first portable communication device (1102) will use to transmit the message. If the locator message does not reach the second portable communication device (1106), then the second portable communication device (1106) is treated as out-of-reach in step 924 and the first portable communication device (1102) resumes its normal operation in step 920.

If the locator message reaches the second portable communication device (1106), then, in step 1204, the first portable communication device (1102) transmits the message using the most appropriate path based on the additional knowledge of the location of the second portable communication device (1106). The first portable communication device (1102) then waits to receive an ACK from the second portable device of the message reception for a predetermined time to avoid waiting for the ACK indefinitely in step 1206. If the first portable communication device (1102) receives an ACK within the predetermined time, then it indicates that the message was successfully received in step 918, and resumes its normal operation in step 920. If the first portable communication device (1102) does not receive an ACK within the predetermined time, then it determines whether the message has been transmitted a predetermined number (N3) of times in step 1208. If N3 has not been exceeded, then the first portable communication device re-transmits the message using the most appropriate path in step 1204. If N3 has been reached, then the second portable communication device is treated as out-of-reach in step 924 and the first portable communication device resumes its normal operation in step 920.

Figure 14:
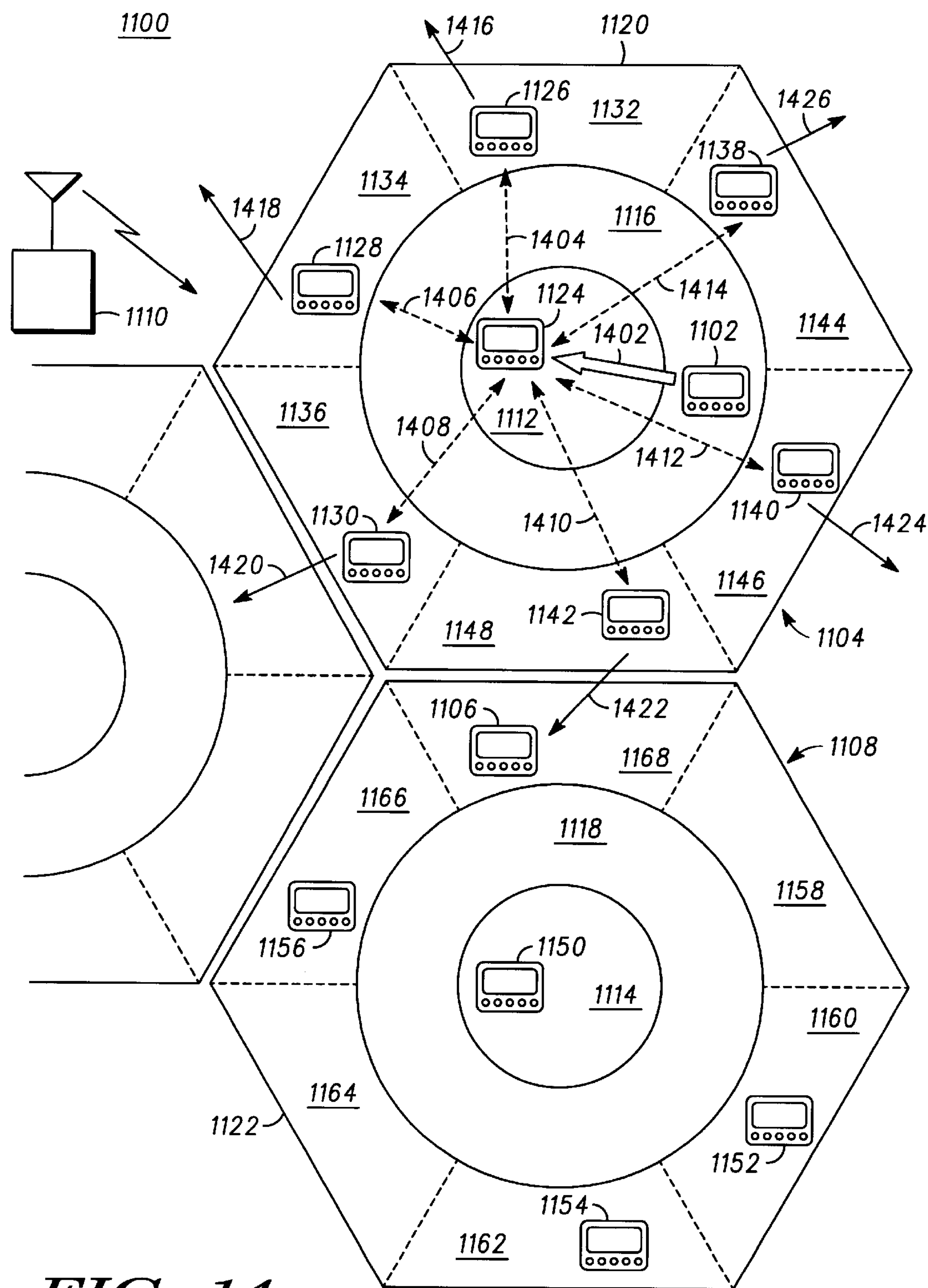
FIG. 14 is a first exemplary block diagram of the wireless communication system of FIG. 11 illustrating communication among portable communication devices for the out-of-cell general broadcasting.

FIG. 14 illustrates an exemplary block diagram of communications among portable communication devices of FIG. 11 for an out-of-cell general broadcasting communication.

The first portable communication device (1102) determines that it is not functioning as a CBU in step 1302, searches for an available CBU in step 1306, and acquires the CBU (1124) from the plurality of portable communication devices located within the first central region (1112) of the first cell (1104) to be used as a router in step 1308. In step 1310, the first portable communication device (1102) then transmits to the CBU (1124) the message and instruction to search for available OBUs located in the first outer region (1120) of the first cell (1104) as indicated by an arrow 1402. As shown in FIG. 14, there is an OBU available and is acquired in each sector as in step 1312, and the CBU (1124) transmits the message to all acquired OBUs (1126, 1128, 1130, 1138, 1140, and 1142) with an instruction for the OBUs to re-transmit the message out of the cell using a predetermined non-repeating out-of-cell propagation pattern as in step 1314. The OBUs return, as in step 1320, ACKs to the CBU (1124). The communications between the CBU (1124) and OBUs are illustrated by arrows 1404, 1406, 1408, 1410, 1412, and 1414. The transmissions of the message by the OBUs out of the cell are illustrated by arrows 1416, 1418, 1420, 1422, 1424, and 1426. The first portable communication device (1102) is notified that the message is transmitted (1318) beyond the cell boundary, and waits for an ACK from the second portable communication device (1106) as in step 1324.

Figure 15:
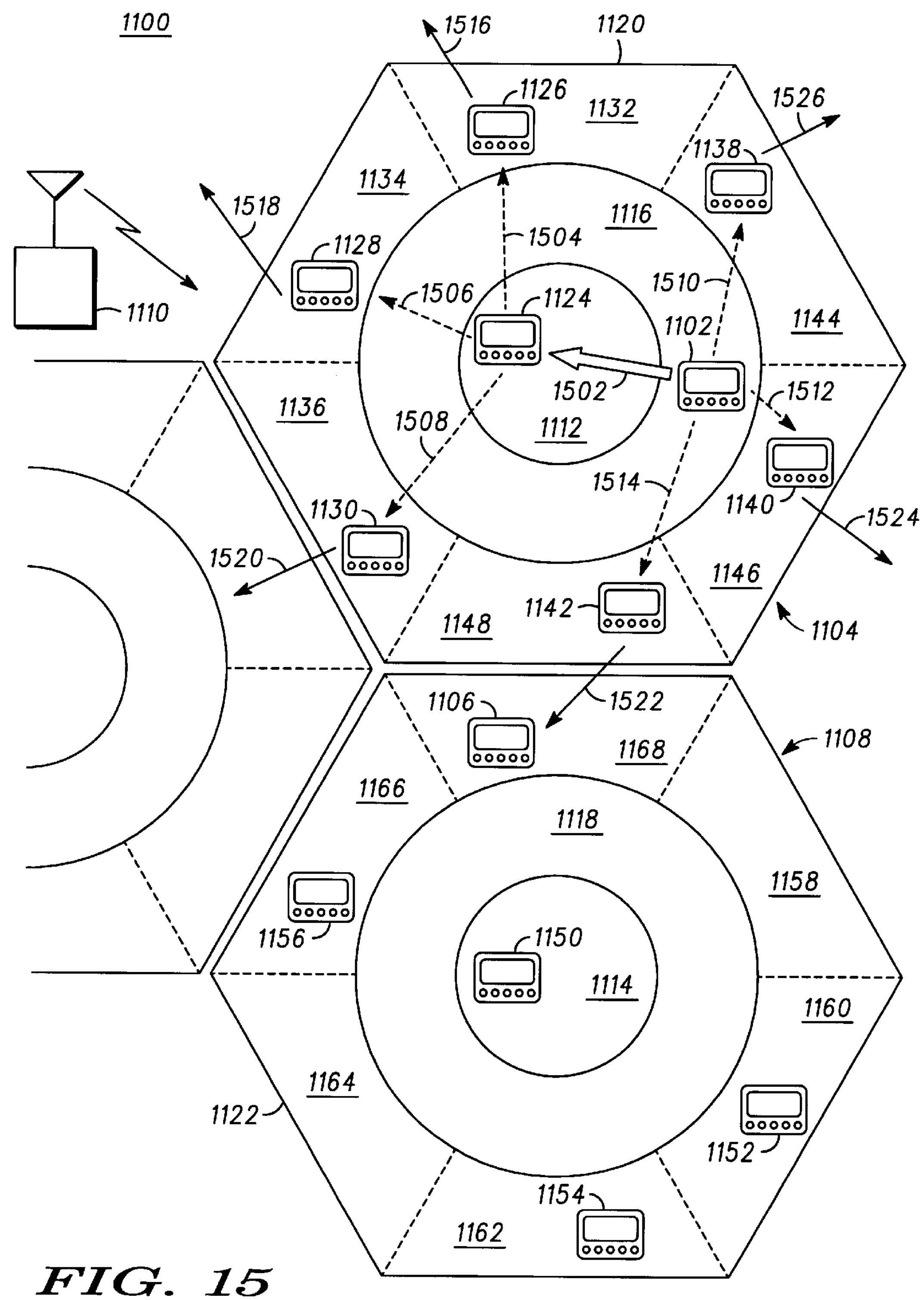
FIG. 15 is a second exemplary block diagram of the wireless communication system of FIG. 11 illustrating communication among portable communication devices for the out-of-cell general broadcasting.

Acquiring of OBUs may be shared between the CBU (1124) and the first portable communication device (1102) as illustrated in FIG. 15.

The first portable communication device (1102) first acquires a CBU (1124) from the plurality of portable communication devices located within a first central region (1112) of the first cell (1104) to be used as a router, then instructs the CBU (1124) to acquire a first set of up to three OBUs (1126, 1128, and 1130) from the plurality of portable communication devices located in the first outer region (1120) of the first cell (1104). The communication between the CBU (1124) and the first portable communication device (1102) is shown as an arrow, 1502, and the communications between the CBU (1124) and the first set of OBUs (1126, 1128, and 1130) are shown as arrows, 1504, 1506, and 1508. Each of the first set of OBU is located in a different sector (1132, 1134, and 1136, respectively) of the first outer region (1120) of the first cell (1104).

The first portable communication device (1102) also acquires a second set of up to three OBUs (1138, 1140, and 1142) from the plurality of portable communication devices located in the first outer region (1120) of the first cell (1104). The communications between the first portable communication device (1102) and the second set of OBUs (1138, 1140, and 1142) are shown as arrows, 1510, 1512, and 1514. Each of the second set of OBUs is located in a different sector of the first outer region (1120) of the first cell (1104) from each other and from the first set (1144, 1146, and 1148, respectively).

The first portable communication device (1102) then transmits a message targeted for the second portable device (1106) along with an out-of-cell broadcast request to the CBU (1124) and to the second set of up to three OBUs (1138, 1140, and 1142).

Upon receiving the message, the CBU (1124) is then instructed to re-transmit the first message along with an out-of-cell broadcast request to the first set of up to three OBUs (1126, 1128, and 1130). The first and second sets of OBUs (1126, 1128, 1130, 1138, 1140, and 1142), upon receiving the message along with an out-of-cell broadcast request, are instructed to transmit the first message to cells adjacent to each of the first and second sets of OBUs (1126, 1128, 1130, 1138, 1140, and 1142). The transmissions of the message by the OBUs are shown by arrows 1516, 1518, 1520, 1522, 1524, and 1526.

Then the first portable communication device (1102) waits to receive an ACK from the second portable communication device (1106) of the message reception through one of the first and second sets of OBUs (1126, 1128, 1130, 1138, 1140, and 1142), and determines whether the second portable communication device has successfully received the first message. An ACK may include, in addition to an actual acknowledgement of the message reception, the time of reception, the location of the second portable device, the message path, and other desired information. If the first portable communication device (1102) receives an ACK within a predetermined time, then it indicates that the message was successfully received, and resume the normal operation. The user of the first portable communication device (1102) may start preparing a new message, and repeat the process. If the first portable communication device (1102) does not receive an ACK within the predetermined time, then the above described steps may be repeated for a predetermined number of times to avoid an infinite loop. This process loop may require to search for a different CBU from the CBU previously used and different sets of OBUs from the previous sets of OBUs already used.

Figure 16:
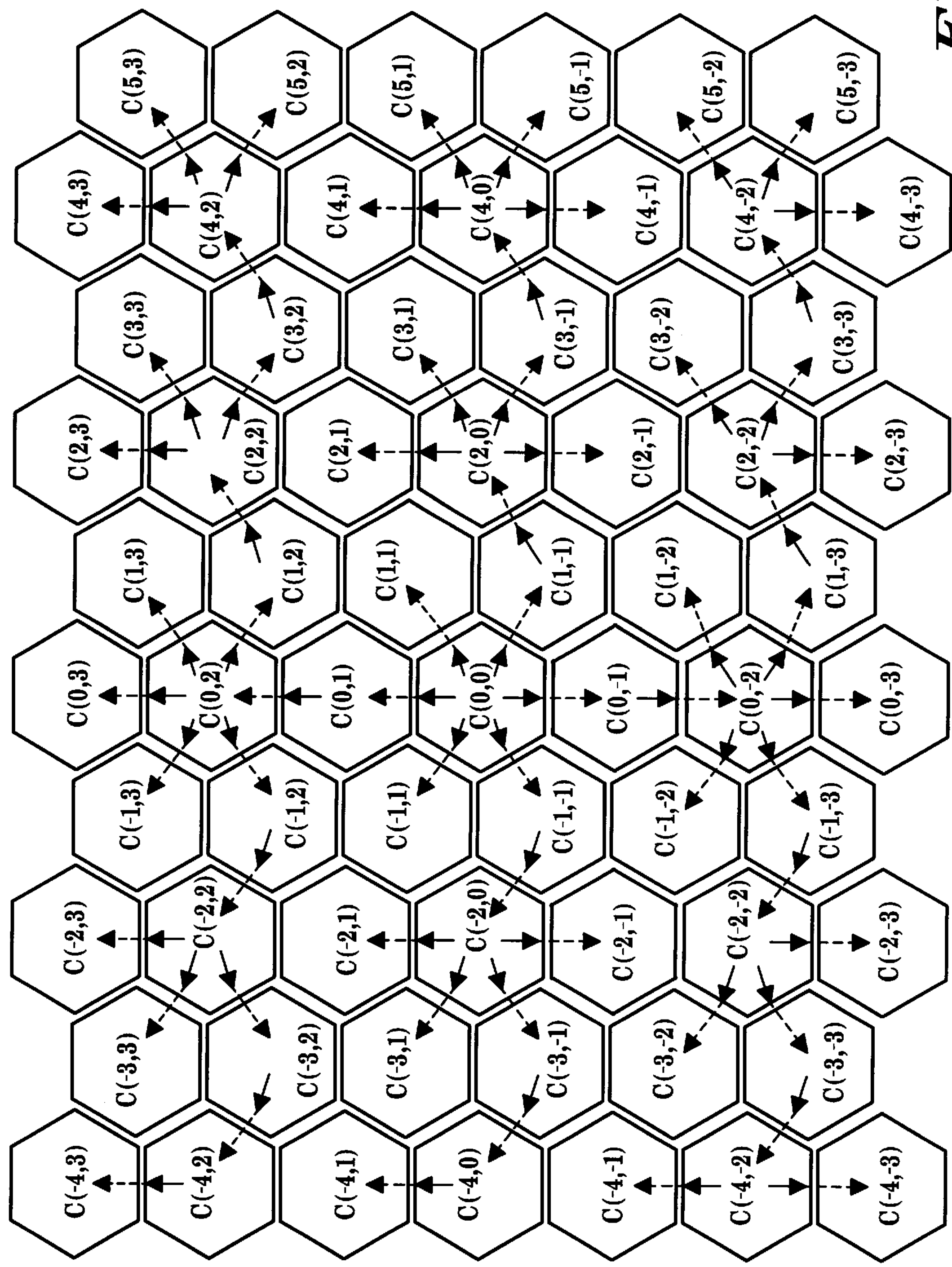
FIG. 16 is an exemplary block diagram representation of a first predetermined non-repeating propagation pattern.

For establishing communication between two portable communication devices located in different cells, each OBU functions as a message originating portable communication device upon receiving an out-of-cell broadcast request. However, to avoid transmitting the same message to any one cell more than once, a predetermined, non-repeating pattern of message propagation is preferably used. FIG. 16 illustrates an example of such non-repeating pattern (1600). A transmission from a CBU to an OBU within a cell is shown with a solid-line arrow, and a transmission from an OBU to a CBU in an adjacent cell is shown with a dashed-line arrow. The message originating portable communication device is located in the reference cell designated C(0, 0).

Figure 17:
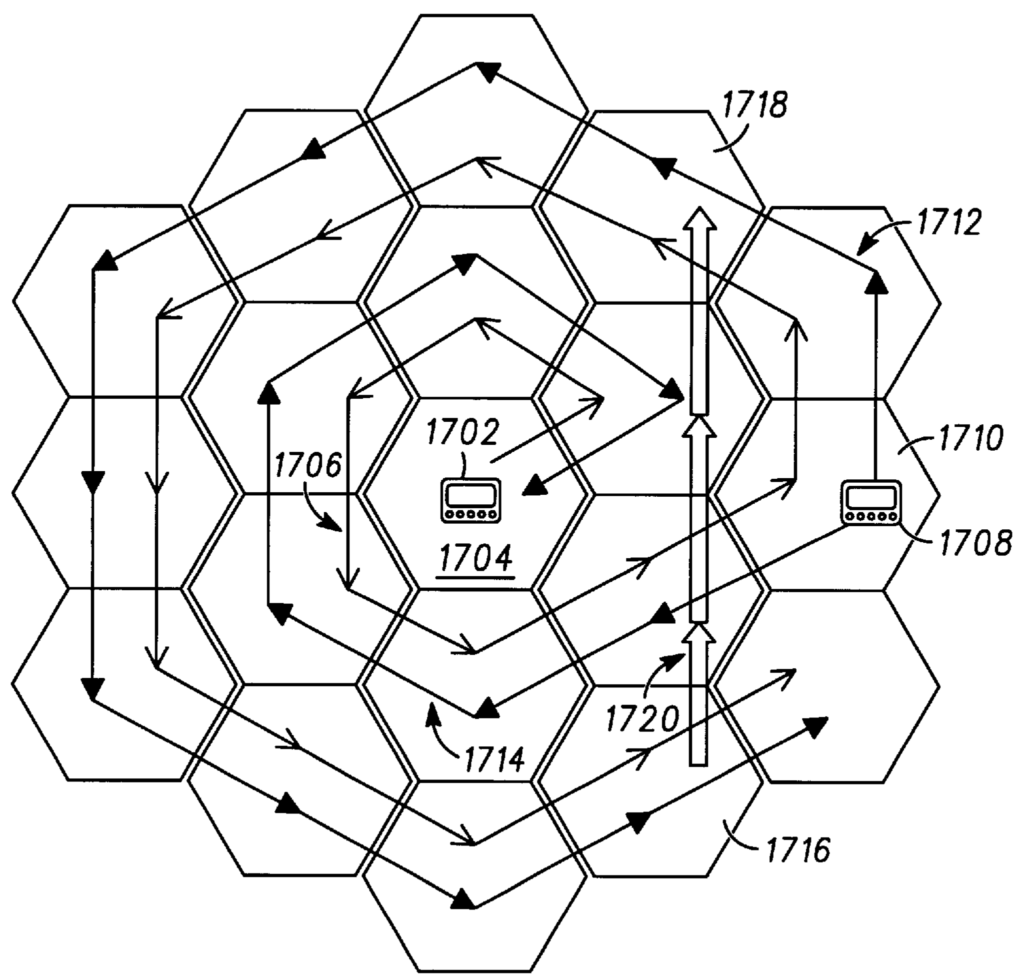
FIG. 17 is an exemplary block diagram representation of a second predetermined non-repeating propagation pattern.

FIG. 17 illustrates another example of a non-repeating pattern of propagation based upon cell locations. If the message originates from a first portable communication device (1702) in the reference cell (1704), then the message propagates along the first path (1706) reaching all the cells. If the message originates from a second portable communication device (1708) from a cell (1710) that is not the reference cell (1704), the message propagate along a second path (1712) which is the same path in the same direction as the first path for the cells ahead of the originating cell (1710) and a third path (1714) which the same path but in the opposite direction as the first path for the cells behind the originating cell (1710). However, if the destination cell is known (1718), then the message may propagate from the originating cell (1716) using the most direct path (1720).

Figure 18:
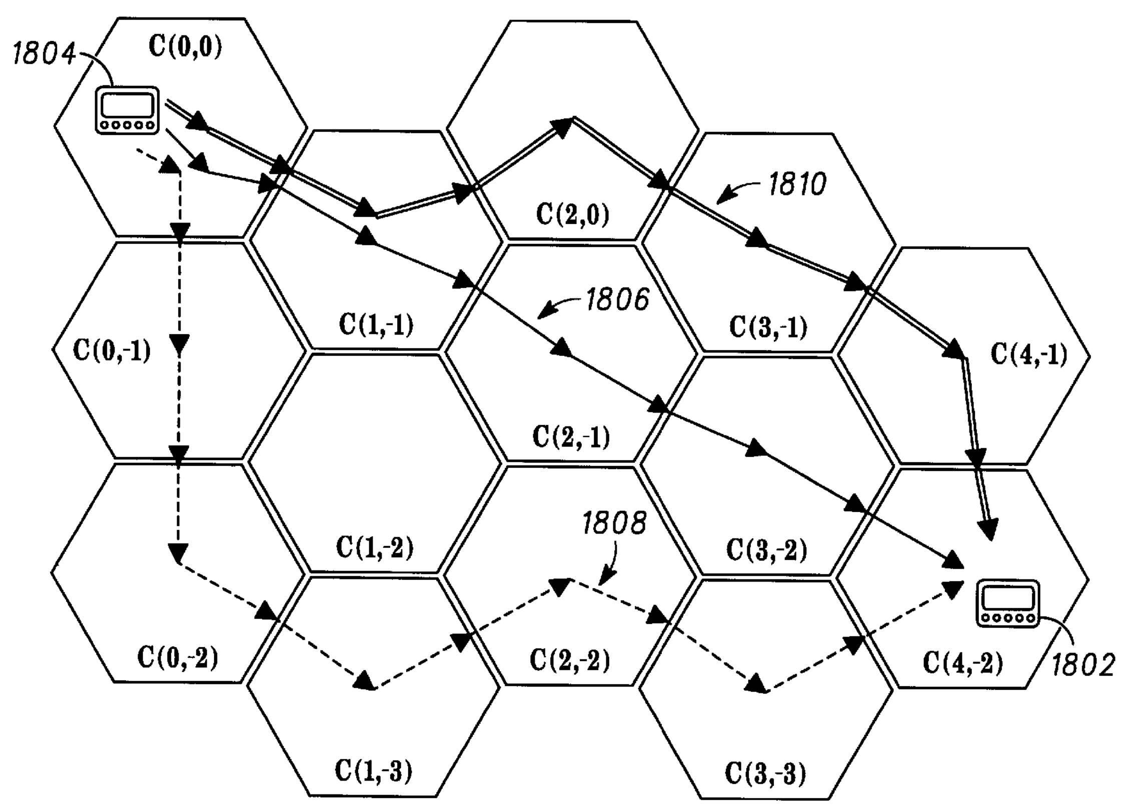
FIG. 18 is a block diagram representation illustrating a predetermined non-repeating, most direct, and alternate propagation patterns.

As illustrated in FIG. 18, if the location of the second portable communication device (1802) is known, then the first portable communication device (1804) which originates a message, need not use the predetermined non-repeating pattern as previously illustrated. Instead, the first portable communication device (1804) may use an appropriate path (1806 shown with solid-line arrows) which may be more direct compared to the path specified (1808 shown as dashed-line arrows) by the predetermined non-repeating pattern. However, if a CBU or an OBU is unavailable in a cell that helps form the most direct path, then an appropriate path may not be the most direct path. An example of an appropriate path that is not most direct (1810 as double-line arrows) is also illustrated in FIG. 18.

Figure 19:
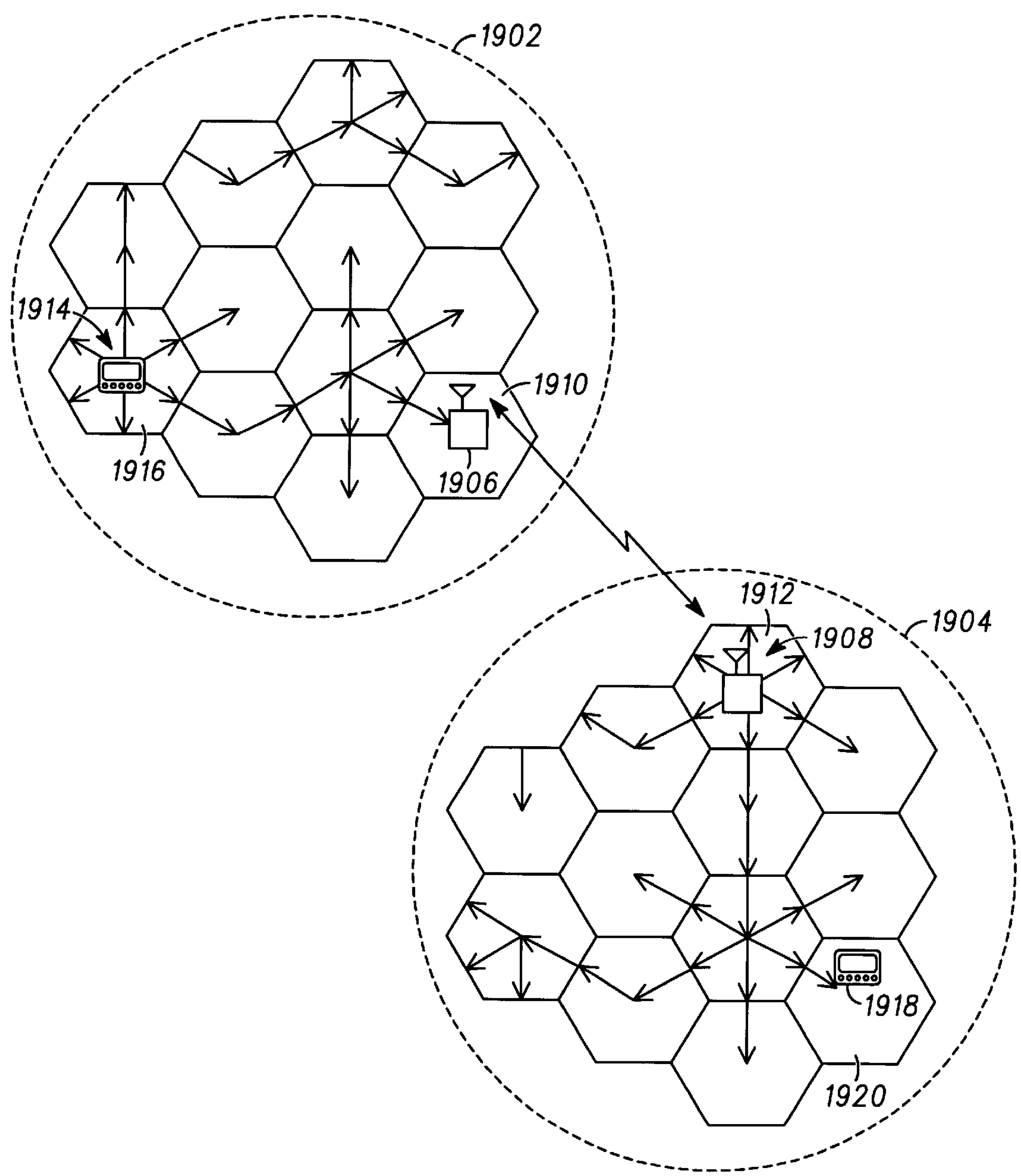
FIG. 19 is a block diagram representation of an exemplary application of the present invention.

FIG. 19 illustrates an exemplary application of the present invention. The communication system (1900) in this example comprises two zones (1902 and 1904) that are physically separated from each other: the first zone, Zone 1 (1902), may cover the EPCOT center region of Walt Disney World, and the second zone, Zone 2 (1904), may cover the Magic Kingdom region. Each zone comprises local cells (12 cells shown in each zone) and a zone translator (first and second zone translators, 1906 and 1908, respectively). The zone translators (1906 and 1908) function as reliable static center boundary units (RSCBUs), but are fixed in place (1906 in cell 1910 and 1908 in cell 1912), and compared to a normal portable device, have more power to cover the distance between zones and have more processing capability to handle multiple communication requirement between zones. This example describes how a first user with a first portable communication device (1914) located in a first cell (1916) of the first zone (1902) may establish communication with a second user with a second portable communication device (1918) in a second cell (1920) of the second zone (1904). As described in the registration process illustrated in FIG. 8, all portable communication devices involved in the communication system (1900) have all relevant information associated with cells and locations.

The first user identifies and selects the desired destination for his message which is the second portable communication device (1918) in the Magic Kingdom (1904). A portable communication device used in this system may provide the desired destination designation as a part of its menu. Instead of displaying "Zone 2," it would display "Magic Kingdom" and automatically associate "Magic Kingdom" with a system area designation of Zone 2 (1904), thereby making it easier for the user to identify and differentiate designated areas. It may also provide a user definable identification for portable communication devices such that user names can be used to identify portable communication devices.

The first user then enters a message into the first portable communication device (1914) and transmits the message to the second portable communication device (1918) by selecting, for example, the "SEND" command. The first portable communication device attaches header information to the message to control the propagation of the message comprising; the identifications of the origination and destination zones, allowed propagation zones, portable communication devices, and cells; acknowledgement (ACK) request; time stamp; and termination requirement by time or number of hops to prevent an infinite propagation. As the message propagates through different portables functioning as CBUs or OBUs in different cells, each of these portables may attach additional header information to the message such as its identification, the message propagation path up to that point, elapsed time, and number hops so far.

In this example, because the user has chosen the Magic Kingdom as the message destination which is the Zone 2 (1904), the message is sent along an appropriate path directed to the first zone translator (1906) to be transmitted to the second zone translator (1908) in the Zone 2 (1904). If the destination of the message is unknown, the message follows a predetermined non-repeating propagation pattern such as the pattern previously describe in FIG. 12. To prevent multiple portable communication devices in the Zone 1 (1902) from attempting to communicate to other portable that are outside of the Zone 1 (1902) such as those in the Zone 2 (1904), the forwarding of the message is terminated in the Zone 1 (1902) except for the message reaching the first Zone translator (1906). The first zone translator (1906) then transmits the message to other zone translators in the system. If the header indicates that the message is only allowed to be sent within a single zone, for example, the destination zone is the same as the origination zone, the zone translator will not transmit the message to another zone translator.

When the second zone translator (1912) receives the message, it extracts the header information, and updates the allowed propagation zone to the Zone 2 (1904). Only zone translators are allowed to change the allowed propagation zone header. Then the second zone translator (1912) initiates transmission of the message following a predetermined non-repeating propagation pattern such as the pattern previously describe in FIG. 12. If portable communication devices in Zone 2 (1904) receive the message from the first zone translator (1906), they will not transmit the message because the header information reveals that the allowed propagation zone for this message is the Zone 1 (1902) and not the Zone 2 (1904).

If the message does not reach the second portable communication device (1918), then the message, having the allowed propagation zone to be the Zone 2 (1904), terminates within the Zone 2 (1904), and will not be further transmitted. If the second portable communication device (1918) receives the message, then it transmits an ACK to the first portable communication device (1914) through an appropriate path which may be a reverse of the path taken by the message to reach the second portable communication device (1918).

Figure 20:
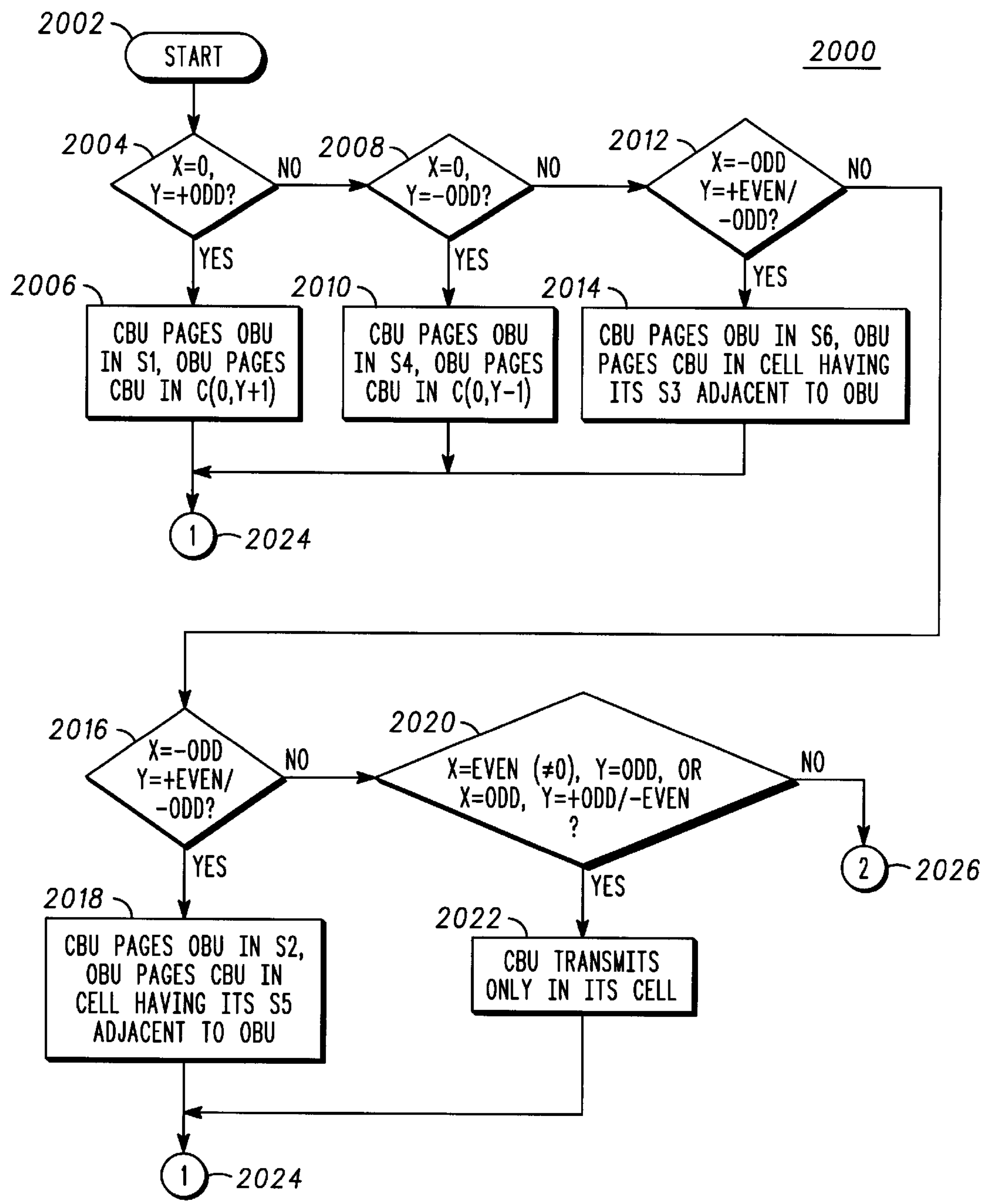
FIG. 20 is an exemplary flowchart illustrating how the message may be propagated out of the message originating cell.
Figure 21:
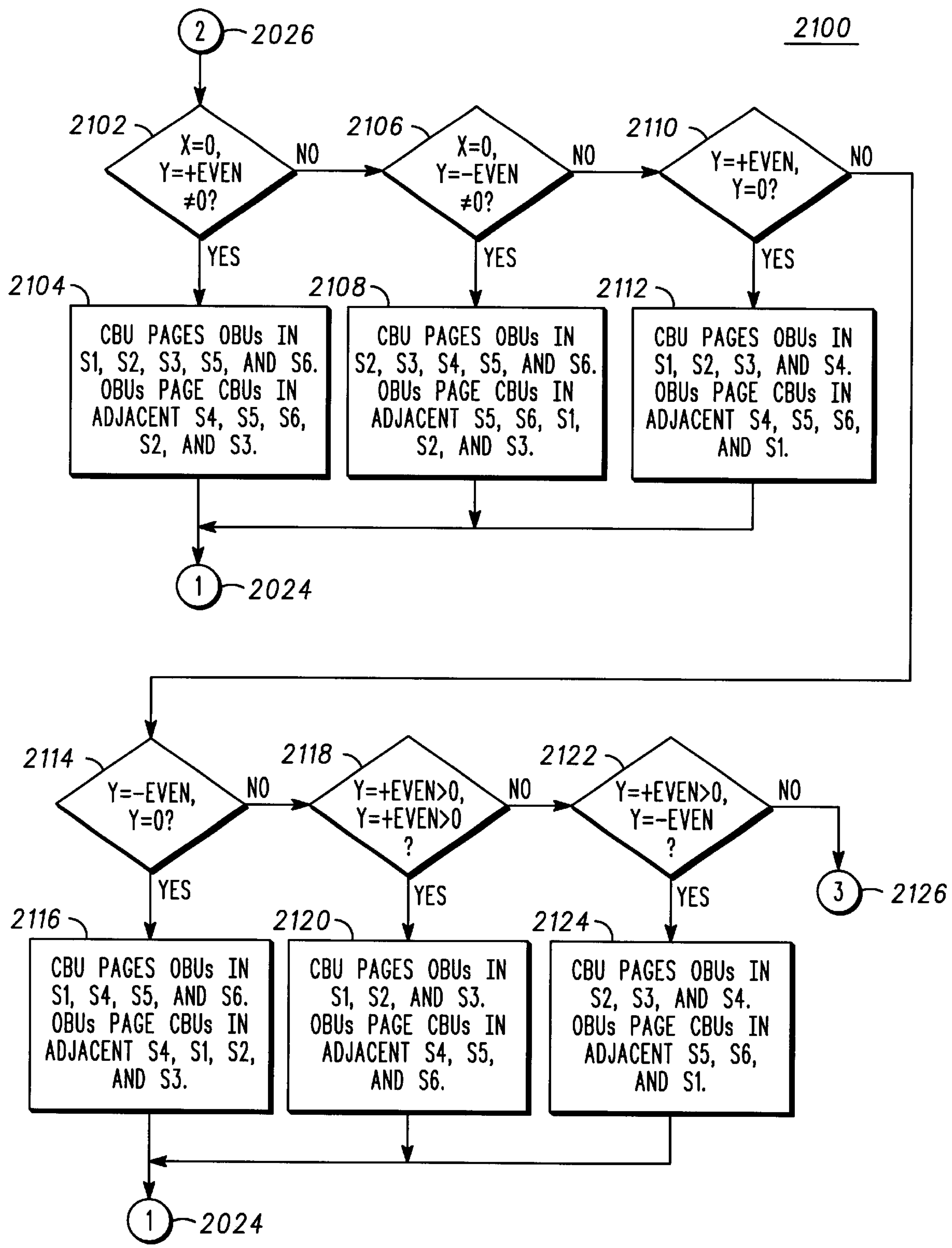
FIG. 21 is a continuation of the flowchart of FIG. 20.
Figure 22:
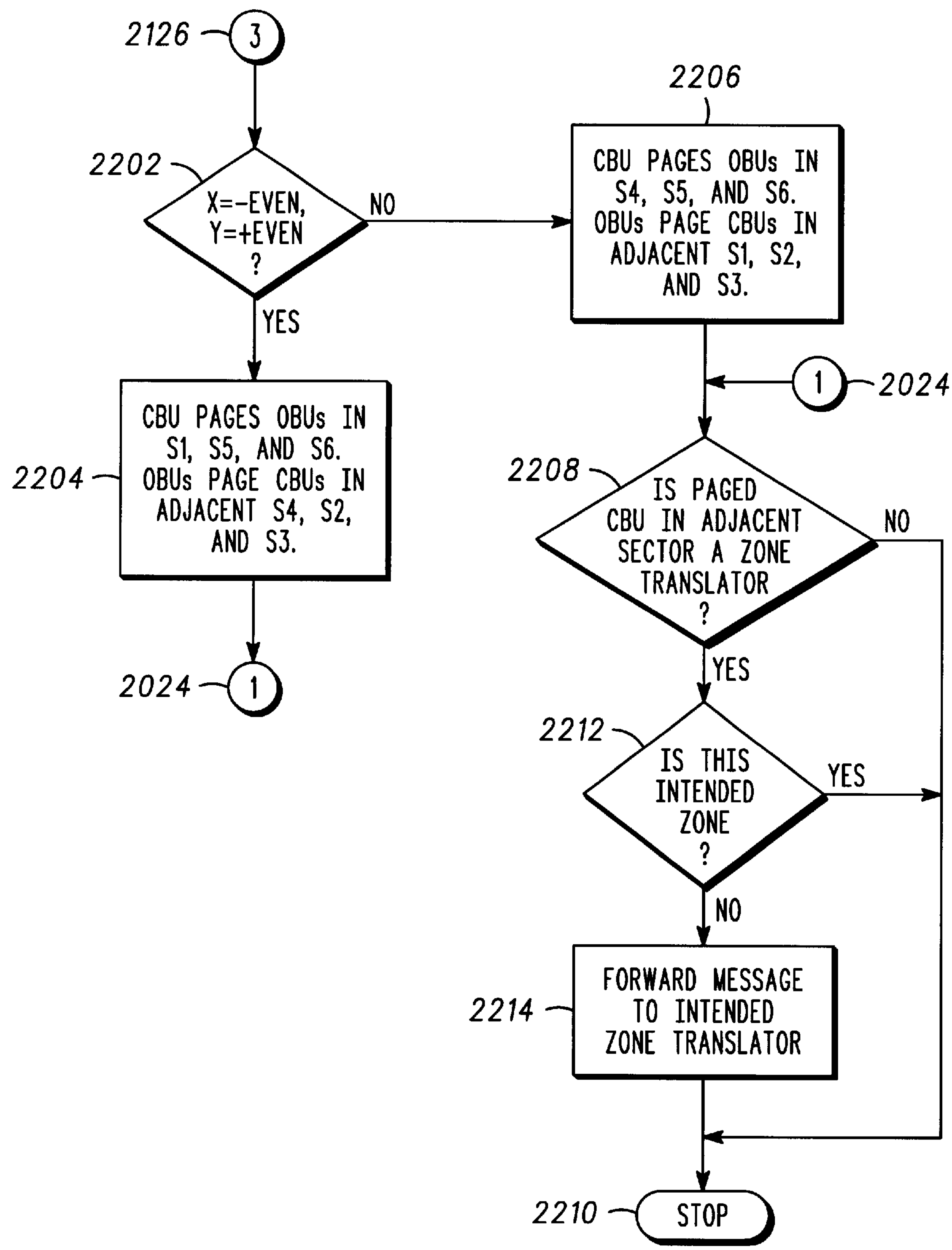
FIG. 22 is a continuation of the flowchart of FIG. 20 and FIG. 21.

FIGS. 20, 21 and 22 illustrate an exemplary flowchart describing how the message may be propagated out of the message originating cell utilizing a dynamic cell coordinate based propagation pattern referenced to the message originating cell. These steps may be considered to be components of the step 1212 in FIG. 12 for short message broadcast and of the step 1214 in FIG. 12 for generating locator message, having acquired all information previously described. In this example, the cell, in which the first portable communication device initiating the message is located, is considered to be the message reference cell having the cell coordinate of C(0, 0). Other cells have corresponding cell coordinates referenced to the message reference cell as shown in FIG. 16. As a result of the first portable communication device failing to receive an ACK from the second portable communication device after transmitting the message within the cell C(0, 0), the first portable communication device begins the general broadcast procedure. This procedure is initiated by the a message being delivered to an OBU in all sectors of cell C(0, 0) with an out of cell propagation request. These OBUs propagate the message to the CBUs with adjacent sectors. For example, the OBUs in sector 1,2,3,4,5,6 propagate the message to the CBUs in the adjacent propagating cells with the adjacent sectors 4,5,6,1,2,3 respectively. The CBUs of the adjacent propagating cells will try to find the second portable communication device unit within its cell before performing any further out of cell propagations. If the second unit can not be located then further out of cell propagation is performed.

Referring to FIG. 20, in step 2004, the coordinate values, relative to the message reference cell, of the propagating cell, X and Y, are compared to a set of coordinates where X being zero and Y being a positive odd number. If the propagating cell has the coordinates of $C_{prop}(0, +odd)$, then, in step 2006, the CBU in this cell sends a message to an OBU in S1 of the cell and the OBU sends a message to a CBU in cell C(0, Y+1) location. If the propagation cell coordinates do not match this set of coordinates, then the next set of coordinates is used.

In step 2008, the coordinate values of the propagation cell, relative to the message reference cell, X and Y, are compared to a set of coordinates where X being zero and Y being a negative odd number. If the propagation cell has the coordinates of $C_{prop}(0, -odd)$, then, in step 2010, the CBU in C(0, −odd) sends a message to an OBU in S4 of the cell and the OBU sends a message to a CBU in a cell C(0, Y−1) location. If the propagation cell coordinate does not match this set of coordinates, then the next set of coordinates is used.

In step 2012, the coordinate values of the propagation cell relative to the message cell, X and Y, are compared to a set of coordinates where X being a negative odd number and Y being a positive even number or a negative odd number. If the propagation cell has the coordinates of $C_{prop}$(−odd, +even or −odd), then, in step 2014, the CBU in $C_{prop}$(−odd, +even or −odd), sends a message to an OBU in S6 of the cell $C_{prop}$(−odd, +even or −odd), and the OBU sends a message to a CBU in a cell which has S3 adjacent to S6 of the cell $C_{prop}$(−odd, +even or −odd). If the propagation cell coordinates do not match this set of coordinates, then the next set of coordinates is used.

In step 2016, the coordinate values of the propagation cell relative to the message cell, X and Y, are compared to a set of coordinates where X being a positive odd number and Y being a positive even number or a negative odd number. If the propagation cell has the coordinates of $C_{prop}$(+odd, +even or −odd), then, in step 2018, the CBU in $C_{prop}$(+odd, +even or −odd), sends a message to an OBU in S2 of the cell $C_{prop}$(+odd, +even or −odd), and the OBU sends a message to a CBU in a cell which has S5 adjacent to S2 of the cell $C_{prop}$(+odd, +even or −odd).If the propagation cell coordinates do not match this set of coordinates, then the next set of coordinates is used.

In step 2020, the coordinate values of the propagation cell relative to the message cell, X and Y, are compared to a set of coordinates where 1) X being a non-zero even number and Y being an odd number, or 2) X being an odd number and Y being a positive odd number or a negative even number. If the propagation cell has the coordinates of $C_{prop}(even \neq 0, odd)$ or $C_{prop}$(odd, odd or −even), then, in step 2022, the CBU in $C_{prop}(even \neq 0, odd)$ or $C_{prop}$(odd, odd or −even), transmits the message only within the cell $C_{prop}(even \neq 0, odd)$ or $C_{prop}$(odd, odd or −even).If the propagation cell coordinates do not match this set of coordinates, then the next set of coordinates is used.

Referring to FIG. 21, in step 2102, the coordinate values of the propagation cell relative to the message cell, X and Y, are compared to a set of coordinates where X being zero and Y being a non-zero positive even number. If the propagation cell has the coordinates of $C_{prop}(0, +even \neq 0)$, then, in step 2104, the CBU in $C_{prop}(0, +even \neq 0)$, sends a message to OBUs in S1, S2, S3, S5 and S6 of the cell $C_{prop}(0, +even \neq 0)$, and the OBUs send a message to the CBUs in cells having S4, S5, S6, S2, and S3 adjacent to S1, S2, S3, S5 and S6 of the cell $C_{prop}(0, +even \neq 0)$, respectively. If the propagation cell coordinates do not match this set of coordinates, then the next set of coordinates is used.

In step 2106, the coordinate values of the propagation cell relative to the message cell, X and Y, are compared to a set of coordinates where X being zero and Y being a non-zero negative even number. If the propagation cell has the coordinates of $C_{prop}(0, -\text{even}\neq 0)$, then, in step 2108, the CBU in $C_{prop}(0, -\text{even}\neq 0)$, sends a message to OBUs in S2, S3, S4, S5 and S6 of the cell $C_{prop}(0, -\text{even}\neq 0)$, and the OBUs page CBUs in cells having S5, S6, S1, S2, and S3 adjacent to S2, S3, S4, S5 and S6 of the cell $C_{prop}(0, -\text{even}\neq 0)$, respectively. If the propagation cell coordinates do not match this set of coordinates, then the next set of coordinates is used.

In step 2110, the coordinate values of the propagation cell relative to the message cell, X and Y, are compared to a set of coordinates where X being a positive even number and Y being zero. If the propagation cell has the coordinates of $C_{prop}(+\text{even}, 0)$, then, in step 2112, the CBU in $C_{prop}(+\text{even}, 0)$, sends a message to OBUs in S1, S2,S3, and S4 of the cell $C_{prop}(+\text{even}, 0)$, and the OBUs sends a message to CBUs in cells having S4, S5, S6, and S1 adjacent to S1, S2, S3, and S4 of the cell $C_{prop}(+\text{even}, 0)$, respectively. If the propagation cell coordinate does not match this set of coordinates, then the next set of coordinates is used.

In step 2114, the coordinate values of the propagation cell relative to the message cell, X and Y, are compared to a set of coordinates where X being a negative even number and Y being zero. If the propagation cell has the coordinates of $C_{prop}(-\text{even}, 0)$, then, in step 2116, the CBU in $C_{prop}(-\text{even}, 0)$, sends a message to OBUs in S1, S4, S5, and S6 of the cell $C_{prop}(-\text{even}, 0)$, and the OBUs page CBUs in cells having S1, S4, S5, and S6 adjacent to S1, S4, S5, and S6 of the cell $C_{prop}(-\text{even}, 0)$, respectively. If the propagation cell coordinates do not match this set of coordinates, then the next set of coordinates is used.

In step 2118, the coordinate values of the propagation cell relative to the message cell, X and Y, are compared to a set of coordinates where X being a positive even number greater than zero and Y being a positive even number greater than zero. If the propagation cell has the coordinates of $C_{prop}(+\text{even}>0, +\text{even}>0)$, then, in step 2120, the CBU in $C_{prop}(+\text{even}>0, +\text{even}>0)$, sends a message to OBUs in S1, S2, and S3 of the cell $C_{prop}(+\text{even}>0, +\text{even}>0)$, and the OBUs page CBUs in cells having S4, S5, and S6 adjacent to S1, S2, and S3 of the cell $C_{prop}(+\text{even}>0, +\text{even}>0)$, respectively. If the propagation cell coordinate does not match this set of coordinates, then the next set of coordinates is used.

In step 2122, the coordinate values of the propagation cell relative to the message cell, X and Y, are compared to a set of coordinates where X being a positive even number greater than zero and Y being a negative even number. If the propagation cell has the coordinates of $C_{prop}(+\text{even}>0, -\text{even})$, then, in step 2124, the CBU in $C_{prop}(+\text{even}>0, -\text{even})$, sends a message to OBUs in S2, S3, and S4 of the cell $C_{prop}(+\text{even}>0, -\text{even})$, and the OBUs sends a message to CBUs in cells having S5, S6, and S1 adjacent to S2, S3, and S4 of the cell $C_{prop}(+\text{even}>0, -\text{even})$, respectively. If the propagation cell coordinates do not match this set of coordinates, then the next set of coordinates is used.

Referring to FIG. 22, in step 2202, the coordinate values of the propagation cell relative to the message cell, X and Y, are compared to a set of coordinates where X being a negative even number and Y being a positive even number. If the propagation cell has the coordinates of $C_{prop}(-\text{even}, +\text{even})$, then, in step 2204, the CBU in $C_{prop}(-\text{even}, +\text{even})$, sends a message to OBUs in S1, S5, and S6 of the cell $C_{prop}(-\text{even}, +\text{even})$, and the OBUs send a message to CBUs in cells having S4, S2, and S3 adjacent to S1, S5, and S6 of the cell $C_{prop}(-\text{even}, +\text{even})$, respectively. If the propagation cell does not have the coordinates of $C_{prop}(-\text{even}, +\text{even})$, then, in step 2206, the CBU in $C_{prop}(-\text{even}, +\text{even})$, sends a message to OBUs in S4, S5, and S6 of the cell $C_{prop}(-\text{even}, +\text{even})$, and the OBUs send a message to CBUs in cells having S1, S2, and S3 adjacent to S4, S5, and S6 of the cell $C_{prop}(-\text{even}, +\text{even})$, respectively.

After completing step 2006, 2010, 2014, 2018, 2022, 2104, 2108, 2112, 2116, 2120, 2124, 2204, or 2206, the role of the CBU is checked in step 2208. If the CBU is not a zone translator, the process is completed in step 2210. If the CBU is a zone translator, then the status of the current zone is checked in step 2212. If the current zone is the intended zone, the process is completed in step 2210. If the current zone is not the intended zone, the message is forwarded to the intended zone translator in step 2214, and the process is completed in step 2210.

In the above examples, the information regarding the restricted, where the message is not to be forwarded, and the allowed sectors, where the message may be forwarded, may be included in the header part of the message. The information may be in a form of directional flags indicating the status of each of the sectors.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for a first portable communication device of a plurality of portable communication devices located at a first location in a wireless communication system to establish communication with a second portable communication device of the plurality of portable communication devices located at a second location, each of the plurality of portable communication devices having a positioning system receiver receiving current location information from a positioning system and having a transceiver for communication at a particular frequency band, the method comprising steps of:

transmitting a first message to the second portable communication device;

if the second portable communication device has received the first message, receiving a first acknowledgment from the second portable communication device;

otherwise, searching for a third portable communication device of the plurality of portable communication devices;

if the third portable communication device is unavailable, indicating the second portable communication device is unreachable;

otherwise, instructing the third portable communication device to function as a first router;

transmitting the first message to the third portable communication device;

instructing the third portable communication device re-transmit the first message as a first repeat message to the second portable communication device; and, determining if the second portable communication device has received the first repeat message.

2. The method according to claim 1, wherein the step of determining if the second portable communication device has received the first message further comprises a step of receiving an acknowledgement of the message reception from the second portable communication device.

3. The method according to claim 2, wherein the acknowledgement comprises a time of reception, a location of the second portable communication device, and a message path.

4. The method according to claim 1, wherein the step of transmitting the first message to the second portable communication device further comprises a step of using a first appropriate path if the second location is known by the first portable communication device.

5. The method according to claim 1, wherein the wireless communication system has a plurality of cells assigned geographically, each of the plurality of cells having a predetermined geographical area and a predetermined set of communication parameters.

6. The method according to claim 5, further comprising steps of:

determining a first cell in which the first portable electronic communication device based upon the first location wherein the first cell has a first geographical area and a first set of communication parameters; and configuring a first transceiver of the first portable communication device compatible with the first set of communication parameters.

7. The method according to claim 6, wherein the step of transmitting the first message to the second portable communication device further comprises a step of transmitting the first message having an identification of the second portable communication device using the first set of communication parameters.

8. The method according to claim 7, wherein the step of searching for the third portable communication device is limited within the first cell.

9. The method according to claim 8, wherein the step of determining if the second portable communication device has received the first repeat message further comprises steps of:

if the second portable communication device has received the first repeat message, receiving a second acknowledgement from the second portable communication device through the third portable communication device; and, otherwise, instructing the third portable communication device to search for a fourth portable communication device of the plurality of portable communication devices located in a second cell adjacent to the first cell.

10. The method according to claim 9, wherein the step of instructing the third portable communication device to search for the fourth portable communication device further comprises steps of:

determining if the fourth portable communication device is available;

if the fourth portable communication device is unavailable, indicating the second portable communication device is unreachable;

otherwise, configuring the fourth portable communication device as a second router;

instructing the fourth portable communication device re-transmit the first repeat message as a second repeat message to the second portable communication device; and, determining if the second portable communication device has received the second repeat message.

11. The method according to claim 10, wherein the step of determining if the second portable communication device has received the second repeat message further comprises steps of:

if the second portable communication device has received the second repeat message, receiving a third acknowledgement from the second portable communication device through the fourth portable communication device then through the third portable communication; and, otherwise, indicating the second portable communication device is unreachable.

12. A method for a first portable communication device of a plurality of portable communication devices located at a first location in a first cell of a plurality of cells to establish communication with a second portable communication device of the plurality of portable communication devices located at a second location in a second cell wherein each of the plurality of portable communication devices having a positioning system receiver receiving location information from a positioning system and having a transceiver for communication at a particular frequency band, wherein each of the plurality of cells is assigned to a predetermined geographical area, has a boundary defining the geographical area, has a central region round a center, a second region surrounding the center region and an outer region surrounding the second region within the boundary, and is divided into six sectors wherein each sector is adjacent to a different cell, the method comprising steps of:

acquiring a third portable communication device of the plurality of portable communication devices located within a first central region of the first cell;

instructing the third portable communication device to acquire a first set of up to three portable communication devices of the plurality of portable communication devices wherein each of the first set of up to three portable communication devices is located in a different sector of the first cell from each other;

acquiring a second set of up to three portable communication devices of the plurality of portable communication devices located in a first outer region of the first cell wherein each of the second set of up to three portable communication devices is located in a different sector of the first cell from each other and from the first set of up to tree portable communication devices;

transmitting a first message targeted for the second portable communication device along with an out-of-cell broadcast request to the third portable communication device and to the second set of up to three portable communication devices located in the first outer region;

instructing the third portable communication device to re-transmit the first message targeted for the second portable communication device along with the out-of-cell broadcast request to the first set of up to three portable communication devices located in the first outer region;

instructing the first and second sets of up to three portable communication devices upon reception of the out-of-cell broadcast request to re-transmit the first message to cells adjacent to each of the first and second sets of up to three portable communication devices; and determining if the second portable communication device has received the first message.

13. The method according to claim 12, wherein the step of instructing the first and second sets of up to three portable communication devices to re-transmit the first message further comprises a step of using a predetermined non-repeating propagation pattern.

14. The method according to claim 12, wherein the step of instructing the first and second sets of up to three portable communication devices to re-transmit the first message further comprises using an appropriate propagation pattern if the location of the second portable communication device is known.

15. The method according to claim 12, wherein the step of determining if the second portable communication device has received the first message further comprises a step of receiving a first acknowledgement sent by the second portable device through one of portable communication devices of the first and second sets of portable communication devices if the second portable communication device has received the first message.

16. The method according to claim 15, wherein the first acknowledgement comprises a time of reception, a location of the second portable communication device, and a message path.

17. A method in a first portable communication device of a plurality of portable communication devices located at a first location in a first cell of a plurality of cells for establishing communication with a second portable communication device of the plurality of portable communication devices located at a second location in a second cell, the method comprising steps of:

determining whether a message originated by the first portable communication device exceeds a predetermined length;

if the message exceed the predetermined length, determining whether the second portable communication device is reachable before sending the message to the second portable communication device;

if the second portable communication device is determined to be reachable, transmitting the message using an appropriate propagation path by:

acquiring a third portable communication device of the plurality of portable communication devices located within a first central region of the first cell;

instructing the third portable communication device to acquire a first set of six portable communication devices of the plurality of portable communication devices wherein each of the six portable communication devices is located in a different sector of the outer region of the first cell from each other; and instructing the first set of six portable communication devices to transmit the message to a second set of six portable communication device of the plurality of portable communication devices, each of the second set of six portable communication devices located in a central region of a different cell adjacent to the first cell;

indicating the message is leaving the first cell; and determining if the second portable communication device has received the message.

18. The method according to claim 17, wherein the step of determining whether the second portable communication device is reachable further comprises a step of transmitting a locator message using a predetermined non-repeating propagation pattern.

19. The method according to claim 17, wherein the step of determining whether the second portable communication device is reachable further comprises a step of transmitting a locator message using a dynamic cell coordinate based propagation pattern referenced to the first cell.

20. The method according to claim 17, wherein:

each of the plurality of portable communication devices has a positioning system receiver receiving location information from a positioning system and has a transceiver for communication at a particular frequency band, and each of the plurality of cells is assigned to a predetermined geographical area, has a boundary defining the geographical area, a central region around a center, a second region surrounding the center region, and an outer region surrounding the second region within the boundary, and is divided into six sectors wherein each sector is adjacent to a different cell.

21. The method according to claim 20, wherein the step of instructing the third portable communication device to acquire the first set of six portable communication device, further comprises steps of:

if less than six portable communication devices are available located in a different sector of the first cell, acquiring the available portable communication devices; and instructing the available portable communication devices to modify propagation patterns to cover all cells adjacent to the first cell.

22. The method according to claim 21, wherein the step of instructing the available portable communication devices to modify propagation patterns further comprises step of restricting the propagation patterns.

23. The method according to claim 22, wherein the step of restricting the propagation patterns further comprises a step of specifying allowed sectors for the message to propagate.

* * * * *